(12) United States Patent
Toshima et al.

(10) Patent No.: US 7,243,954 B2
(45) Date of Patent: Jul. 17, 2007

(54) PIPE JOINT WITH EARTHQUAKE-PROOF FUNCTION

(75) Inventors: Toshio Toshima, Amagasaki (JP); Takashi Yokomizo, Amagasaki (JP); Takeshi Hara, Amagasaki (JP)

(73) Assignee: Kubota Corporation, Osaka (JP)

( * ) Notice: Subject to any disclaimer, the term of this patent is extended or adjusted under 35 U.S.C. 154(b) by 27 days.

(21) Appl. No.: 10/539,744

(22) PCT Filed: Dec. 22, 2003

(86) PCT No.: PCT/JP03/16499

§ 371 (c)(1),
(2), (4) Date: Jun. 20, 2005

(87) PCT Pub. No.: WO2004/061354

PCT Pub. Date: Jul. 22, 2004

(65) Prior Publication Data

US 2006/0108797 A1    May 25, 2006

(30) Foreign Application Priority Data

Jan. 7, 2003   (JP) .............................. 2003-000742
Jan. 29, 2003  (JP) .............................. 2003-019594
Nov. 4, 2003   (JP) .............................. 2003-373851

(51) Int. Cl.
F16L 21/00 (2006.01)

(52) U.S. Cl. ........................ 285/232; 285/231; 285/321

(58) Field of Classification Search ................ 285/231, 285/224, 232, 321
See application file for complete search history.

(56) References Cited

U.S. PATENT DOCUMENTS 3,712,648 A * 1/1973 Clifford ...................... 285/321
4,082,321 A * 4/1978 Nakajima et al. ............. 285/39
4,097,074 A * 6/1978 Nagao et al. ................ 285/231
4,116,478 A * 9/1978 Yamaji et al. .............. 285/302
5,609,368 A * 3/1997 Maki et al. .................... 285/12

FOREIGN PATENT DOCUMENTS

| JP | 5229624 | * | 3/1977 | ................. 285/321 |
| JP | 5229625 | * | 3/1977 | ................. 285/321 |
| JP | 5334126 | * | 3/1978 | ................. 285/321 |
| JP | 5458221 | * | 5/1979 | ................. 285/321 |
| JP | 06-002791 | | 1/1994 | |

(Continued)

*Primary Examiner*—David Bochna
(74) *Attorney, Agent, or Firm*—Fildes & Outland, P.C.

(57) ABSTRACT

A pipe joint with earthquake-proof function is provided. A lock ring engages with an accommodating groove of a socket. A tapered surface converging toward the opening side of the socket is formed on at least one of a portion of the lock ring engaging the accommodating groove and a portion of the accommodating groove engaging the lock ring. When a disengagement prevention force in a pipe axial direction for preventing a spigot from being disengaged from the socket by the engagement is transmitted from an accommodating groove to the lock ring through the tapered surface, a line of action of a component force of the disengagement prevention force in a direction perpendicular to the tapered surface passes the opening side of the socket of a contacting point between a socket bottom end part of the lock ring and the outer periphery of the spigot along the outer surface of the spigot.

10 Claims, 22 Drawing Sheets

FOREIGN PATENT DOCUMENTS

| | | |
|---|---|---|
| JP | 2000-170968 | 6/2000 |
| JP | 2000-230680 | 8/2000 |
| JP | 2000-257772 | 9/2000 |
| JP | 2002-005359 | 1/2002 |
| JP | 2002-005360 | 1/2002 |
| JP | 2002-005361 | 1/2002 |
| JP | 2002-323181 | 11/2002 |

* cited by examiner

PIPE JOINT WITH EARTHQUAKE-PROOF FUNCTION

TECHNICAL FIELD

The present invention relates to a pipe joint with earthquake-proof function.

BACKGROUND ART

A pipe joint with earthquake-proof function has, at the same time, an expansion/contraction function and a disengagement prevention function.

For such a pipe joint, a pipe joint of a socket-spigot structure in which a spigot formed at an end of one pipe is inserted inside a socket formed at an end of the other pipe joined with respect to each other is known. The pipe joint is configured so that a lock ring is accommodated in an accommodating groove formed at the inner circumference of the socket and is engaged with a spigot projection formed at the outer periphery of the spigot from the inner part of the socket to exhibit an earthquake-proof function. The lock ring is configured so as to elastically press against the outer periphery of the spigot. A tapered surface is formed on the outer periphery of the lock ring, and due to the reactive force based on the contact of the tapered surface with the inner circumferential edge of the accommodating groove, the lock ring presses against the outer periphery of the spigot and a satisfactory earthquake-proof function is exhibited.

In the pipe joint with earthquake-proof function of such a configuration, since the lock ring is engaged with the spigot projection, an annular groove for fitting the lock ring does not need to be formed on the outer periphery of the spigot to engage the lock ring and the spigot, and thus can be applied to a pipe essentially having a thin thickness. The lock ring is pressed against the outer periphery of the spigot by the action of the tapered surface thereof, and thus a plurality of set bolts do not need to be separately used along the pipe circumference from the outer periphery side of the socket to press the lock ring against the outer periphery of the spigot. Therefore, a sealing structure for the set bolt does not need to be used. Further, after arranging the lock ring within the accommodating groove of the socket and expanding the diameter, the attachment of the lock ring is completed by simply inserting the spigot into the socket, and thus, the application is greatly enhanced compared to when using the set bolt. Moreover, since the set bolt and the sealing mechanism thereof are unnecessary, application failure thereof does not arise, and the reliability of the application enhances.

DISCLOSURE OF THE INVENTION

The present invention aims to further improve the above-mentioned earthquake-proof pipe joint.

The present invention provides a pipe joint with earthquake-proof function, wherein a lock ring is accommodated in a lock ring accommodating groove formed at an inner surface of a socket of one pipe configuring the pipe joint, a projection formed at an outer periphery of a distal end of a spigot of another pipe, configuring the pipe joint and being inserted to the socket, is configured to be able to engage with the lock ring from the socket inner side, disengagement of the spigot from the socket can be prevented as the lock ring is configured to be able to engage with the accommodating groove, a tapered surface converging toward the opening side of the socket is formed on at least one of a portion of the lock ring engaging the accommodating groove and a portion of the accommodating groove engaging the lock ring, and when a disengagement prevention force in a pipe axial direction for preventing the spigot from being disengaged from the socket by the engagement is transmitted from the accommodating groove to the lock ring through the tapered surface, a line of action of a component force of the disengagement prevention force in a direction perpendicular to the tapered surface passes the opening side of the socket of a contacting point between a socket bottom end part of the lock ring and the outer periphery of the spigot along the outer surface of the spigot.

Therefore, according to the present invention, by configuring the line of action of the component force in the direction perpendicular to the tapered surface of the disengagement prevention force to pass the opening side of the socket of the contacting point between the socket bottom part of the lock ring and the outer periphery of the spigot along the outer surface of the spigot, the rotating force in a direction that the lock ring presses against the outer periphery of the spigot can act on the lock ring with the contacting point as the center. Thus, the lock ring can be reliably prevented from floating from the outer periphery of the spigot.

BEST MODE FOR CARRYING OUT THE INVENTION

EMBODIMENT 1

Figure 1:
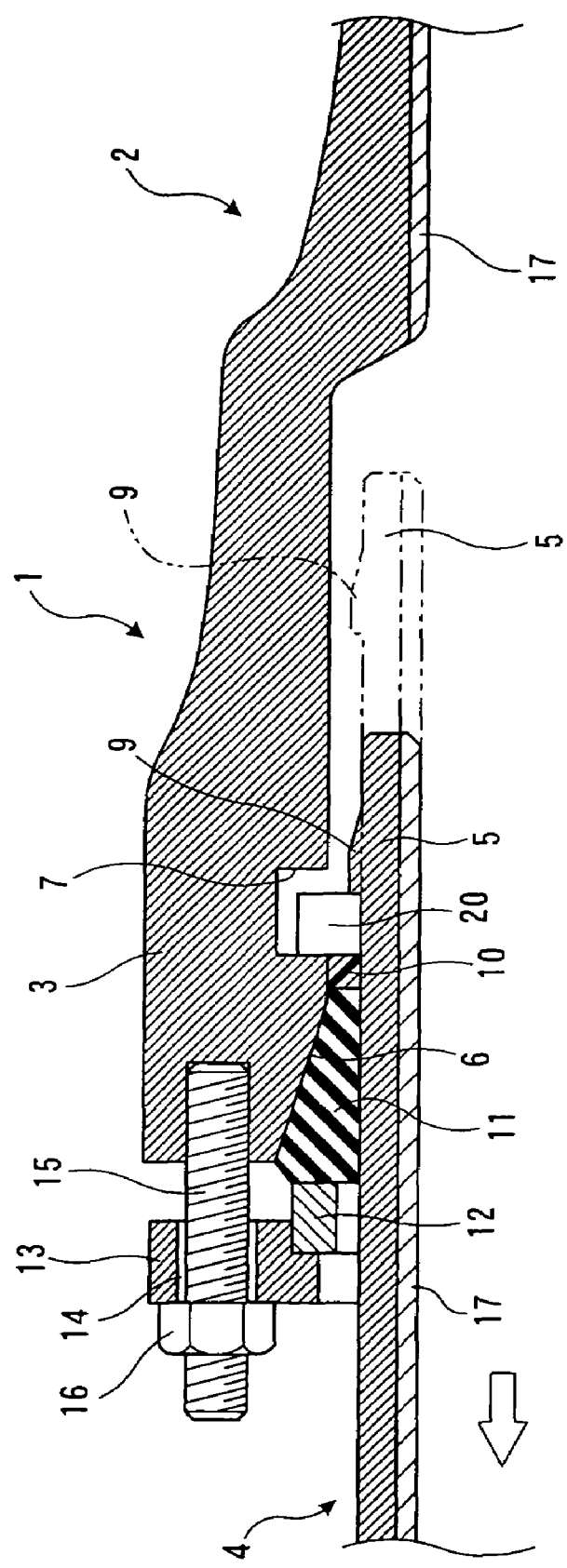
FIG. 1 is a cross sectional view of the main part of a pipe joint with earthquake-proof function of Embodiment 1 of the present invention.

FIG. 1 shows Embodiment 1 of a pipe joint with an expansion/contraction function and a disengagement prevention function, that is, an earthquake-proof function based on the present invention.

The earthquake-proof pipe joint 1 shown in FIG. 1 has a spigot 5 formed at an end of one pipe 4 made of cast iron inserted inside a socket 3 formed at an end of the other pipe 2 made of cast iron. A tapered sealing material pressing surface 6 and a lock ring accommodating groove 7 are formed on the inner surface of the socket 3 from the opening side toward the inner side of the socket 3. A lock ring 20 made of metal singularly divided along the circumferential direction is accommodated in the lock ring accommodating groove 7. A spigot projection 9 that can engage with the lock ring 20 from the back side of the socket 3 is integrally formed at the outer periphery of a distal end 2 of the spigot 5.

A backup ring 10 made of resin and a sealing material 11 made of rubber that contacts the sealing material pressing surface 6 are arranged toward the opening side of the socket 3 from the lock ring 20, between the inner circumferential surface of the socket 3 and the outer peripheral surface of the spigot 5. A split ring 12 that can contact the sealing material 11 and a push ring 13 that can contact the split ring 12 are arranged on the outer peripheral surface of the spigot 5 on the external side of the socket 3. A plurality of through holes 14 in a pipe axial direction are formed along the circumferential direction of the push ring 13, and when each of the plurality of bolts 15 in the pipe axial direction embedded at the end of the socket 3 is passed through the through hole 14 and the nut 16 is then screw-fitted to the bolt 15, the sealing material 11 is compressed between the sealing material pressing surface 6 of the socket 3 and the outer peripheral surface of the spigot 5, and the necessary sealing function is thereby exhibited.

Lining layers 17 and 17 are formed on the inner circumference of the pipes 2 and 4.

When a large tensile force caused by earthquake and the like acts on the earthquake-proof pipe joint 1 configured as described above, the expansion/contraction function can be exhibited as the spigot 5 slips out with respect to the socket 3 by a predetermined range from a state in which the spigot 5 is inserted to the inner side of the socket 3 as shown with a virtual line in the figure to a state in which the spigot projection 9 is engaged with the lock ring 20 as shown with a solid line. Further, when the spigot projection 9 is engaged with the lock ring 20 from the inner side of the socket 3, the disengagement prevention function can be exhibited. Thus, the earthquake-proof function can be exhibited.

Figure 2:
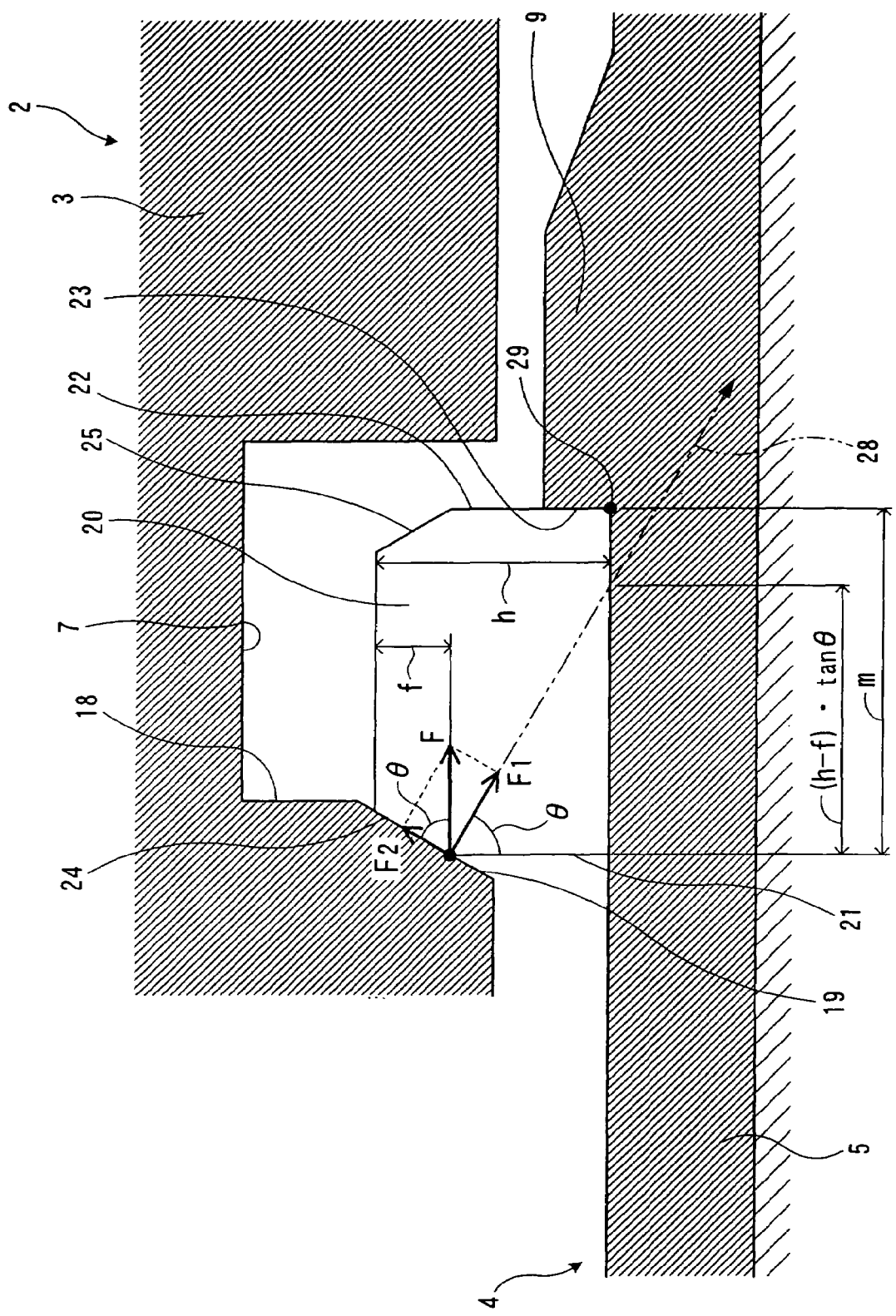
FIG. 2 is an enlarged view of the main part of FIG. 1.

As shown in detail in FIG. 2, a tapered surface 19 that converges toward the opening side of the socket 3 is formed at the side surface 18 on the socket opening side of the lock ring accommodating groove 7.

The lock ring 20 is formed from a metal material. The opening-side side surface 21 on the socket opening side and the inner-side side surface 22 on the socket inner side of the lock ring 20 are formed perpendicular to the outer peripheral surface of the spigot 5. The inner-side side surface 22 is surface-contactable to the end face 23 on the socket opening side of the spigot projection 9. A tapered surface 24 that converges toward the socket opening side and that surface-contacts the tapered surface 19 is formed in the opening-side side surface 21 of the lock ring 20 at a portion corresponding to the tapered surface 19 of the lock ring accommodating groove 7. A tapered surface 25, similar to the tapered surface 24, is also formed in the opposite direction at the inner-side side surface 22 of the lock ring 20. This is to eliminate errors when accommodating the lock ring 22 in the accommodating groove 7 by eliminating the forward and backward restriction in the direction of the lock ring 22.

Figure 3A:
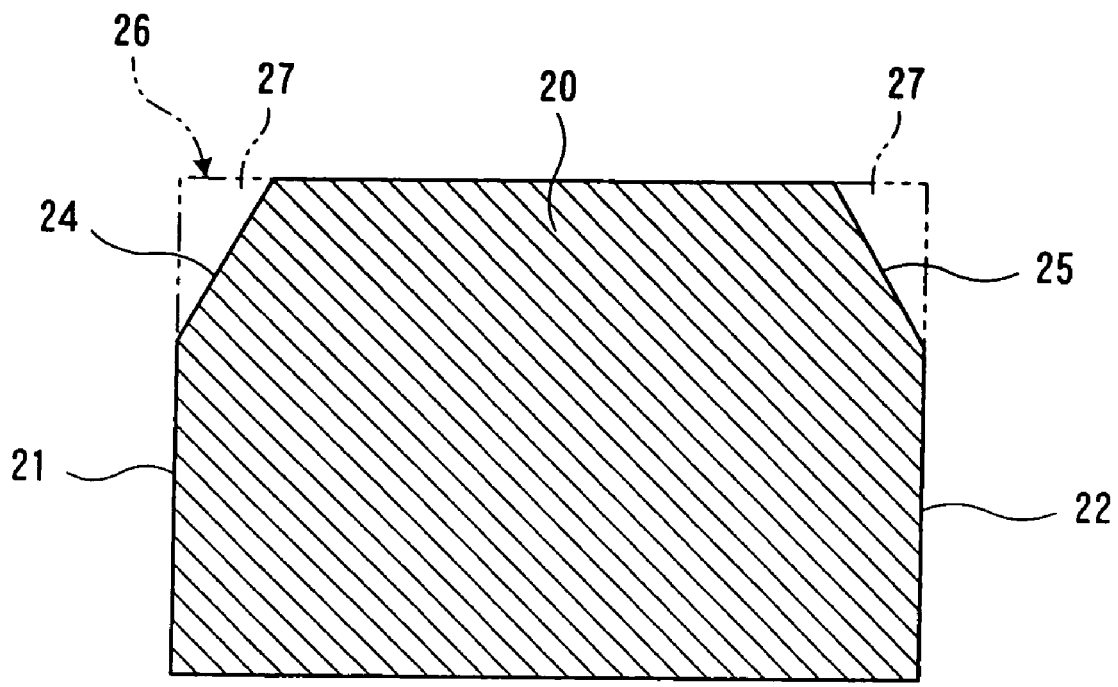
FIG. 3A is an enlarged view of a lock ring shown in FIGS. 1 and 2.

The lock ring 20 is obtained by machining a ring shaped member 26 having a rectangular transverse cross section as shown with a virtual line in FIG. 3A and removing the unnecessary portions 27 and 27. The machining margin is not very large.

In the pipe joint shown in FIGS. 1 and 2, when a large tensile force acts in the pipe axial direction due to earthquake and the like, a disengagement prevention force F in the pipe axial direction acts from the tapered surface 19 of the lock ring accommodating groove 7 toward the tapered surface 24 of the lock ring 20. The acting point is an end point on the socket opening side at the tapered surface 24 of the lock ring 20, as shown in the figure. The disengagement prevention force F is divided into a component force F1 in a direction perpendicular to the tapered surface 24 of the lock ring 20 (tapered surface 19 of the accommodating groove 7) and a component force F2 in a direction along the tapered surface 24 (tapered surface 19) at the acting point.

The line of action 28 of the component force F1 in the direction perpendicular to the tapered surface 24 of the lock ring 20 (tapered surface 19 of the groove 7) needs to pass through the inner circumference side of a contacting point 29 between the inner-side side surface 22 of the lock ring 20 and the outer peripheral surface of the spigot 5. In other words, the line of action 28 passes a position on the opening side of the socket 3 of the contacting point 29 along the outer surface of the spigot 5.

To this end, the width m of the lock ring 20 satisfies the following inequality:

$$m > (h-f)\tan\theta \quad (i)$$

wherein θ denotes the inclination angle of the tapered surface 24 (tapered surface 19 of the groove 7) with respect to the pipe axial direction, f denotes the length (hereinafter referred to as "height") in the pipe diameter direction of the portion of the tapered surface 24 contacting the tapered surface 19 of the groove 7, and h denotes the height of the lock ring 20 from the outer peripheral surface of the spigot 5.

Figure 4:
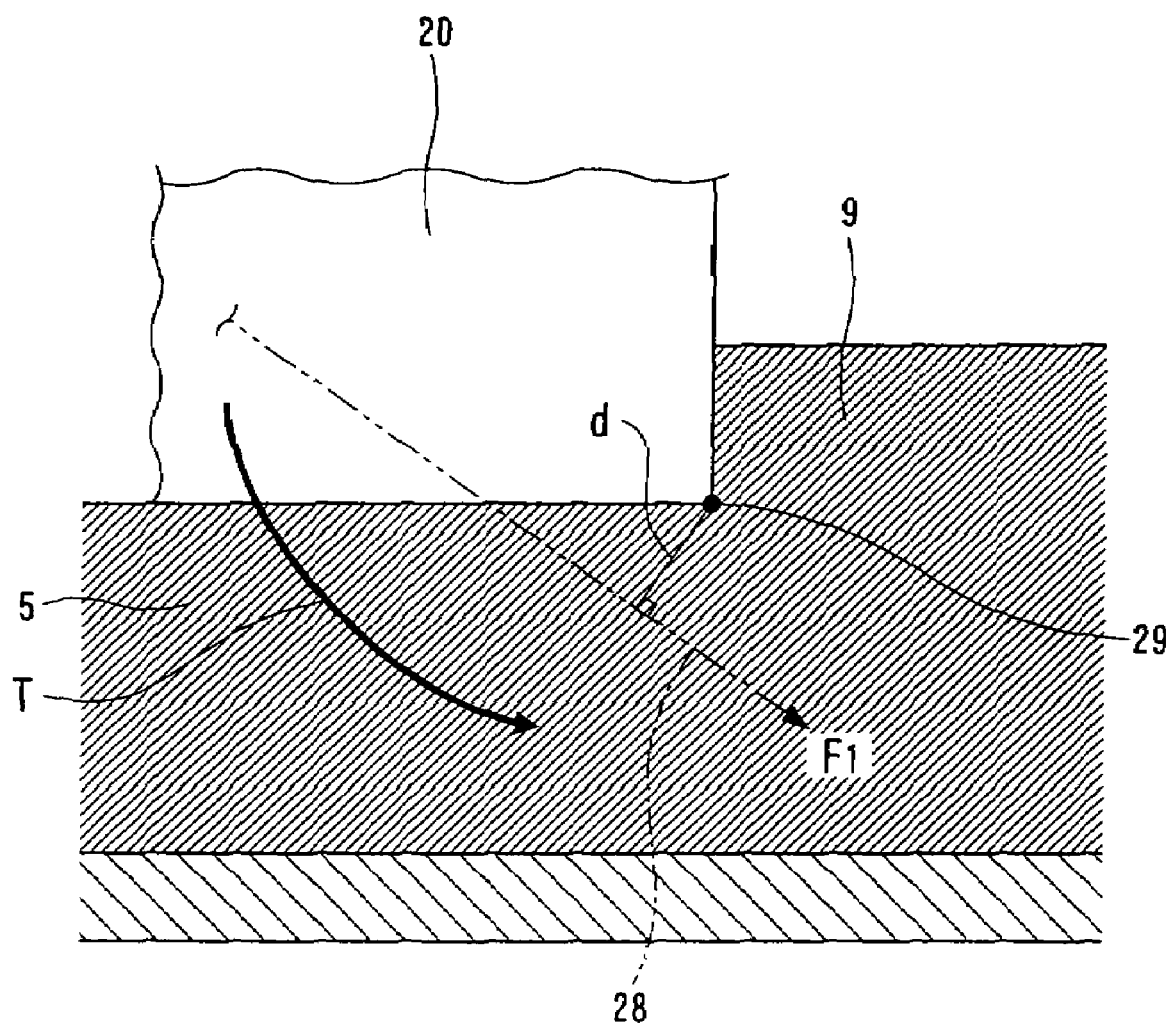
FIG. 4 is a view showing a function of the lock ring in the pipe joint of Embodiment 1.

Thus, as mentioned above, the line of action 28 of the component force F1 passes the socket opening side of the contacting point 29 along the outer surface of the spigot 5. Consequently, as shown in FIG. 4, the line of action 28 lies inward along the radial direction of the contacting point 29 by a distance d. As a result, the rotating force T=F1·d in a direction that the lock ring 20 does not float from the outer peripheral surface of the spigot 5, that is, in a direction that the lock ring 20 presses against the outer peripheral surface of the spigot 5 acts on the lock ring 20 around the contacting point 29.

Therefore, by defining the width m of the lock ring 20, the height h of the lock ring 20, and the height f of the tapered surface 24 based on the above inequality (i), the lock ring 20 can be reliably prevented from floating from the outer peripheral surface of the spigot 5.

EMBODIMENT 2

Figure 5:
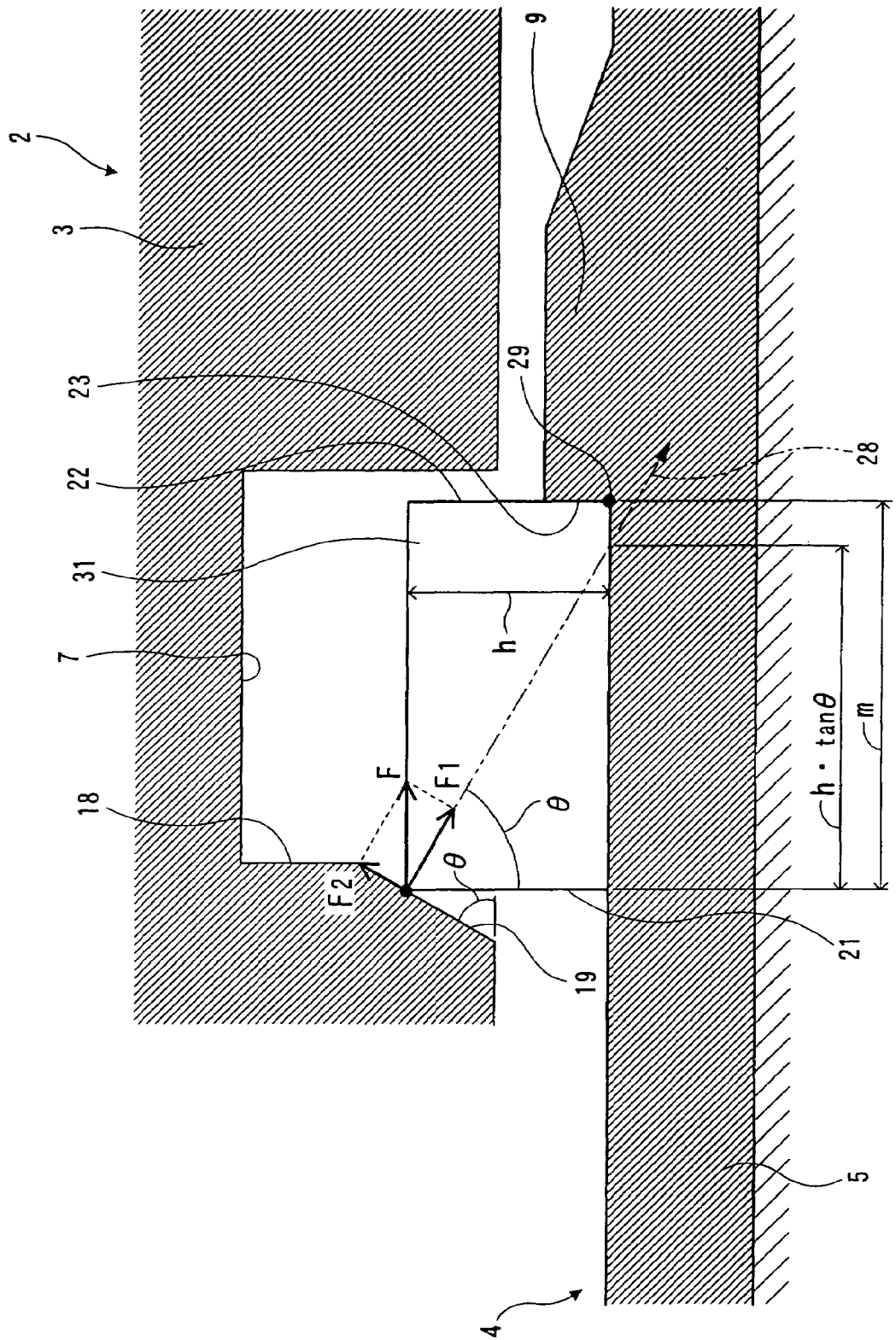
FIG. 5 is a cross sectional view of the main part of a pipe joint with earthquake-proof function of Embodiment 2 of the present invention.

As shown in FIG. 5, a pipe joint with earthquake-proof function of Embodiment 2 has a structure that a lock ring 31 having a rectangular transverse cross section without a tapered surface is applied in place of the lock ring 20 in the pipe joint of Embodiment 1. In Embodiment 2, the configuration of the other parts is the same as the pipe joint of Embodiment 1. In this case, the tapered surface 19 in the lock ring accommodating groove 7 can contact the lock ring 31 at the edge portion at a position on the outermost side in the radial direction of the opening-side side surface 21 of the lock ring 31.

When the lock ring 31 having a rectangular transverse cross section without a tapered surface, as shown in FIG. 5 is applied, machining for removing the unnecessary portions 27 and 27 shown in FIG. 3A does not need to be performed on the lock ring 20 compared to a case where the lock ring 20 with the tapered surfaces 24 and 25 shown in FIGS. 2 and 3A is applied.

When a large tensile force in the pipe axial direction acts on the pipe joint with this structure due to earthquake and the like, the disengagement prevention force F in the pipe axial direction acting from the tapered surface 19 in the lock ring accommodating groove 7 toward the corner portion in the opening-side side surface 21 of the lock ring 31 is divided into the component force F1 in the direction perpendicular to the tapered surface 19 and the component force F2 in the direction along the tapered surface 19 at the position of the corner portion.

At this time, the line of action 28 of the component F1 needs to pass through the socket opening side that is outer than the contacting point 29, between the inner-side side surface 22 of the lock ring 31 and the outer peripheral surface of the spigot 5 along the outer peripheral surface of the spigot 5. To this end, the lock ring 31 is formed so that the width m of the lock ring 31 satisfies the following inequality:

$$m > h\cdot\tan\theta \quad (ii)$$

wherein θ denotes the inclination angle of the tapered surface 19 of the accommodating groove 7 with respect to the pipe axial direction, and h denotes the height of the lock ring 31 from the outer peripheral surface of the spigot 5.

Thus, by forming the width m and the height h of the lock ring 31 to the dimensions satisfying the above inequality (ii), the line of action 28 of the component force F1 can reliably pass through the socket opening side that is outer than the contacting point 29, along the outer surface of the spigot 5.

Thus, similar to the case described above with reference to FIG. 4, the lock ring 31 can be prevented from floating from the outer peripheral surface of the spigot 5.

EMBODIMENT 3

Figure 6:
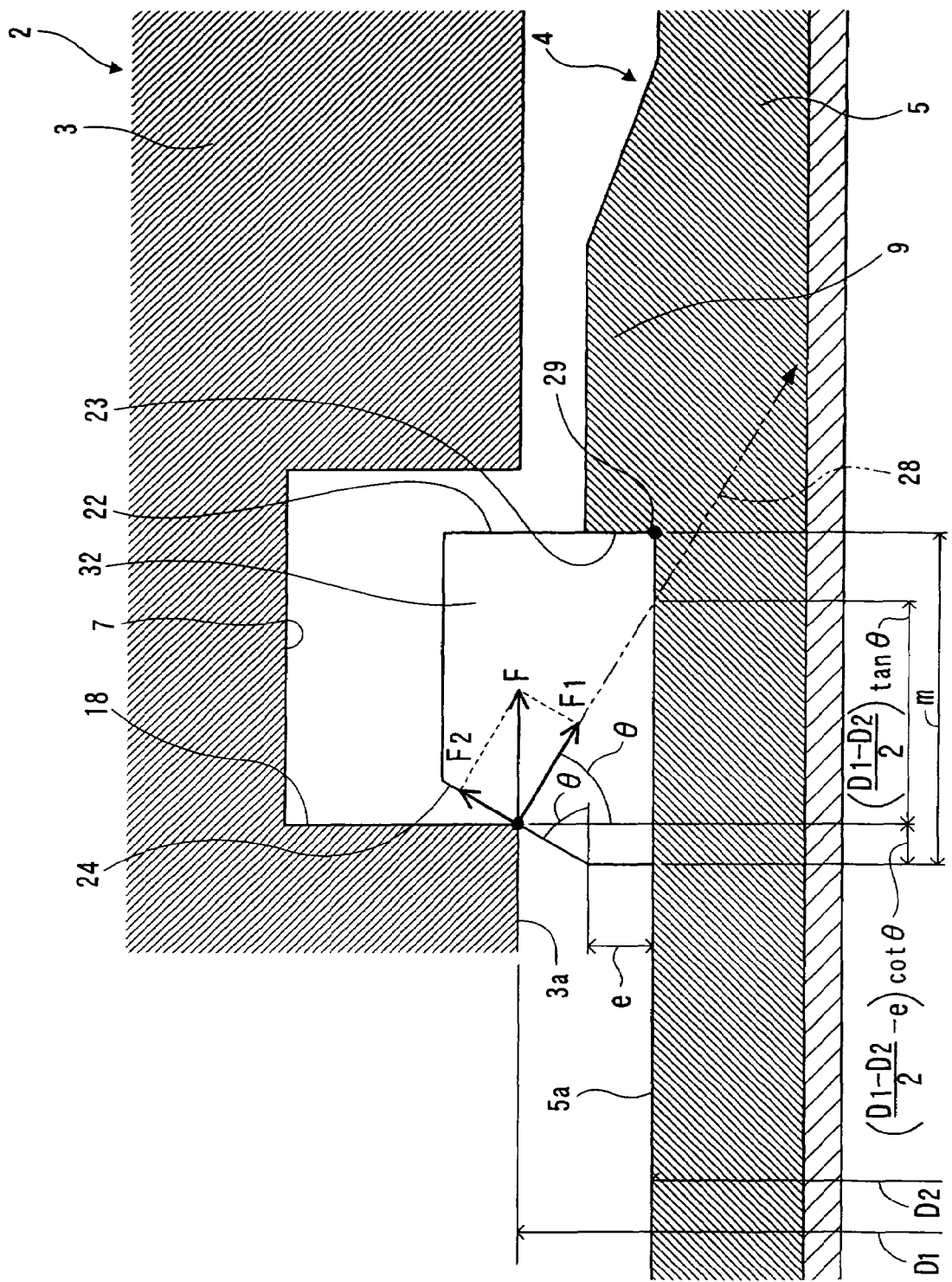
FIG. 6 is a cross sectional view of the main part of a pipe joint with earthquake-proof function of Embodiment 3 of the present invention.

A pipe joint with earthquake-proof function of Embodiment 3 has a structure that a lock ring 32 having one part of the tapered surface 24 formed at the opening-side side surface capable of entering between the inner circumferential surface 3a of the socket 3 and the outer peripheral surface 5a of the spigot 5 is applied, as shown in FIG. 6, in place of the lock ring 20 or 31 in the pipe joint of Embodiment 1 or 2. Further, a tapered surface is not formed on the side surface 18 on the socket opening side of the lock ring accommodating groove 7. Other configurations are the same as the pipe joint of Embodiment 2. In this case, the lock ring accommodating groove 7 can contact the tapered surface 24 of the lock ring 32 at the edge portion at a position on the innermost side in the pipe diameter direction of the side surface 18 on the socket opening side.

Figure 3B:
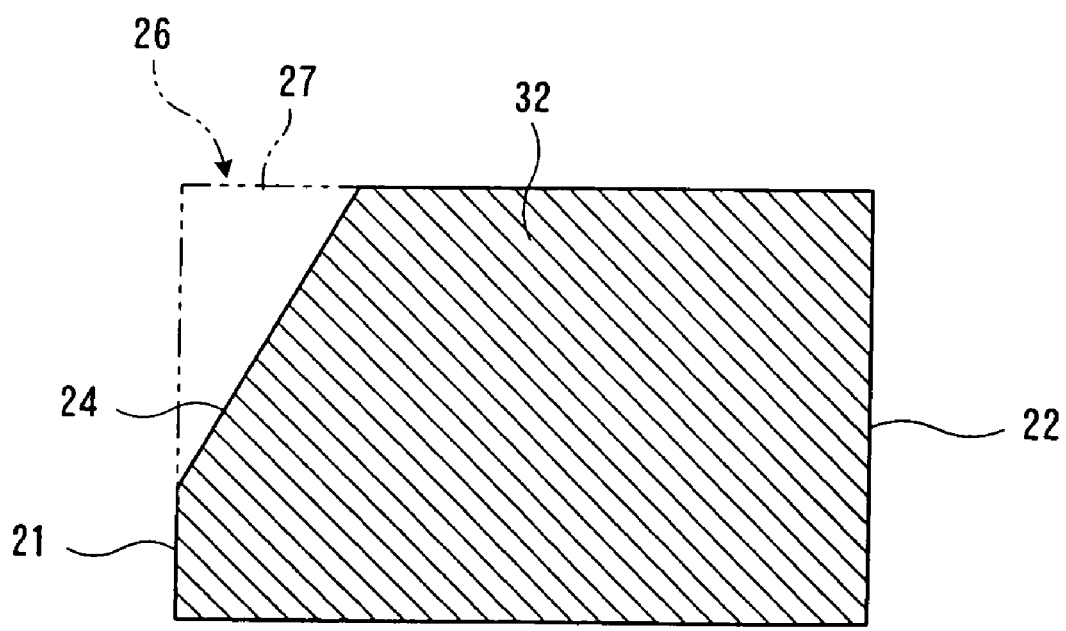
FIG. 3B is an enlarged view of another lock ring.

The lock ring 32 is obtained by machining the ring shaped member 26 having a rectangular transverse cross section and removing the unnecessary portion 27, as shown with a virtual line in FIG. 3B.

When a large tensile force in the pipe axial direction acts on the pipe joint with this structure due to earthquake and the like, the disengagement prevention force F in the pipe axial direction acting from the position of the edge portion on the innermost side along the pipe diameter direction of the side surface 18 on the socket opening side of the lock ring accommodating groove 7 toward the tapered surface 24 of the lock ring 32 is divided into the component force F1 in the direction perpendicular to the tapered surface 24 and the component force F2 in the direction along the tapered surface 24 at the position of the corner portion.

At this time, the line of action 28 of the component force F1 in the direction perpendicular to the tapered surface 24 needs to pass through the socket opening side that is outer than the contacting point 29, along the outer peripheral surface 5a of the spigot 5. To this end, the lock ring 32 is formed so that the width m of the lock ring 32 satisfies the following inequality:

$$m > \{(D1-D2)/2\} \tan \theta + [\{(D1-D2)/2\}-e] \cot \theta \quad \text{(iii)},$$

wherein θ denotes the inclination angle of the tapered surface 24 with respect to the pipe axial direction, D1 denotes the inner diameter of the socket 3, D2 denotes the outer diameter of the spigot 5, and e denotes the height obtained by subtracting the height of the tapered surface 24 itself from the height of the lock ring 32, that is, the height from the outer peripheral surface 5a of the spigot 5 to the tapered surface 24.

Thus, by forming the width m of the lock ring 32 and the height e of the tapered surface 24 from the outer peripheral surface 5a of the spigot 5 to the dimensions satisfying the above inequality (iii), the line of action 28 of the component force F1 can reliably pass through the socket opening side that is outer than the contacting point 29, along the outer peripheral surface 5a of the spigot 5.

Thus, similar to the cases of Embodiment 1 and Embodiment 2, the lock ring 32 can be prevented from floating from the outer peripheral surface 5a of the spigot 5 (FIG. 4).

Figure 7A:
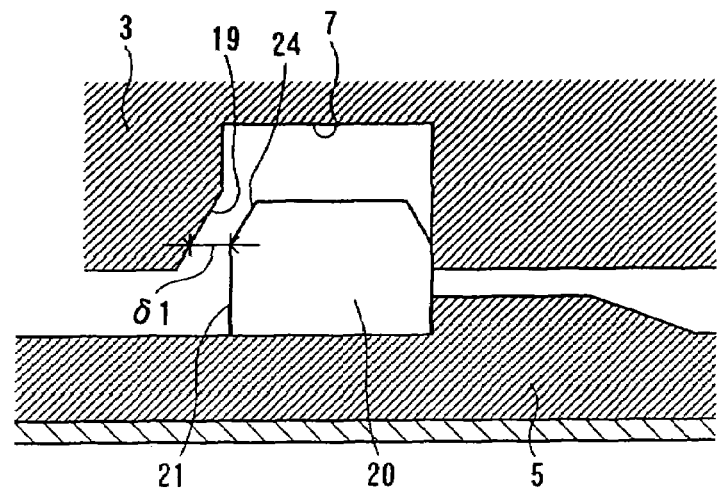
FIG. 7A is a view showing one example of a gap between the lock ring and an accommodating groove.
Figure 7B:
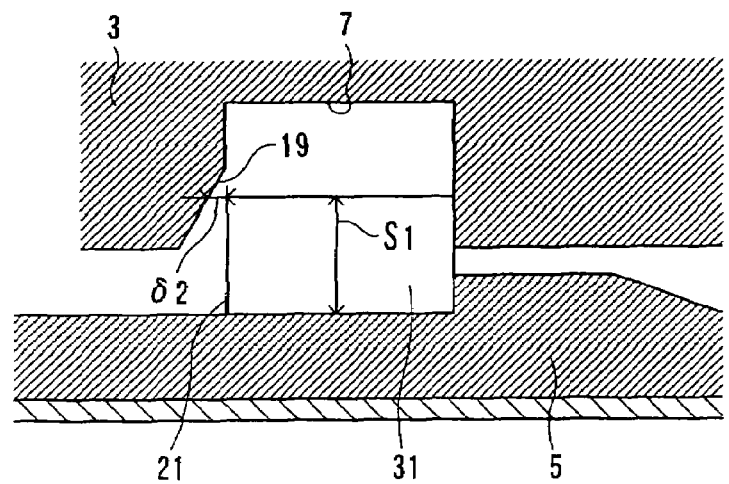
FIG. 7B is a view showing another example of a gap between the lock ring and the accommodating groove.
Figure 7C:
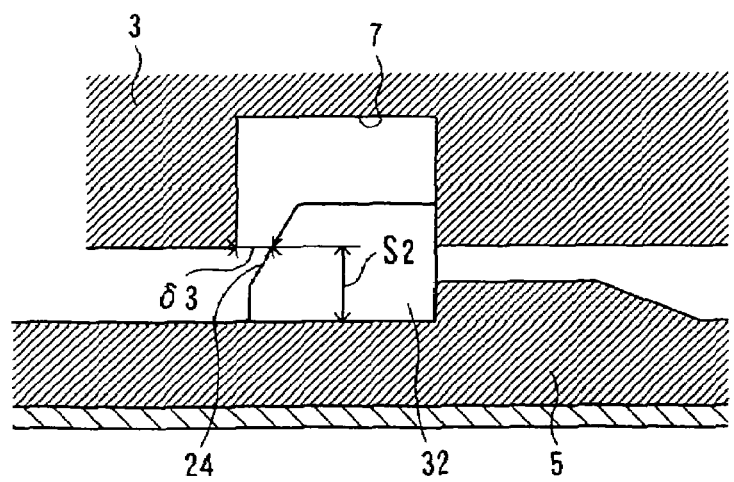
FIG. 7C is a view showing still another example of a gap between the lock ring and the accommodating groove.

FIGS. 7A to 7C show gaps δ1, δ2 and δ3 in the pipe axial direction between the lock ring accommodating groove 7 and the lock ring 20, 31 or 32 in Embodiments 1 to 3. In Embodiments 1 to 3, the gap between the lock ring accommodating groove 7 and the lock ring 20, 31 or 32 is the largest in Embodiment 1 where the tapered surface 19 is formed in the lock ring accommodating groove 7 and the tapered surface 24 is formed in the lock ring 20, as shown in FIG. 7A. If the gap δ1 between the lock ring accommodating groove 7 and the lock ring 20 is large as such, the bending angle of the joint when a bending moment acts on the pipe joint becomes large. Therefore, the pipe joints of Embodiments 2 and 3 are more preferable than the pipe joint of Embodiment 1 in terms of the performance on the bending moment.

Comparing the pipe joint of Embodiment 2 shown in FIG. 7B and the pipe joint of Embodiment 3 shown in FIG. 7C, the height in the pipe diameter direction of the contacting position between the tapered surface 19 of the lock ring accommodating groove 7 and the lock ring 31 in FIG. 7B, that is, the height S1 (=h) from the outer peripheral surface of the spigot 5 is higher than the height S2 of the contacting position of the edge portion of the lock ring groove 7 and the lock ring 32 in FIG. 7C. As shown in FIG. 7B, if the contacting position between the tapered surface 19 of the lock ring accommodating groove 7 and the lock ring 31 from the outer peripheral surface of the spigot 5 is high, the position of the line of action 28 (FIG. 5) of the component force F1 also becomes high. As a result, the line of action 28 shifts from the socket opening side toward the socket inner side. The width of the lock ring 31 along the pipe axial direction must then be increased compared to the pipe joint shown in FIG. 7C. On the other hand, as shown in FIG. 7C, if the height S2 of the contacting position between the edge portion of the lock ring accommodating groove 7 and the lock ring 32 is low, the line of action 28 (FIG. 6) of the component force F1 can be shifted from the socket inner side toward the socket opening side. As a result, the width of the lock ring 20 can be reduced compared to the case of the pipe joint of FIG. 7B. Therefore, of the pipe joints described in Embodiments 1 to 3, the pipe joint described in Embodiment 3 is the most suitable.

In the pipe joints of Embodiments 1 to 3, as apparent from the inequalities (i) to (iii), the lock rings 20, 31 and 32 are prevented from floating from the outer peripheral surface of the spigot 5 by changing the width and the like of the lock rings 20, 31 and 32, but is not limited thereto, and may be responded by, for example, changing the inclination angle and the like of the tapered surface 24 (tapered surface 19).

EMBODIMENT 4

Figure 8:
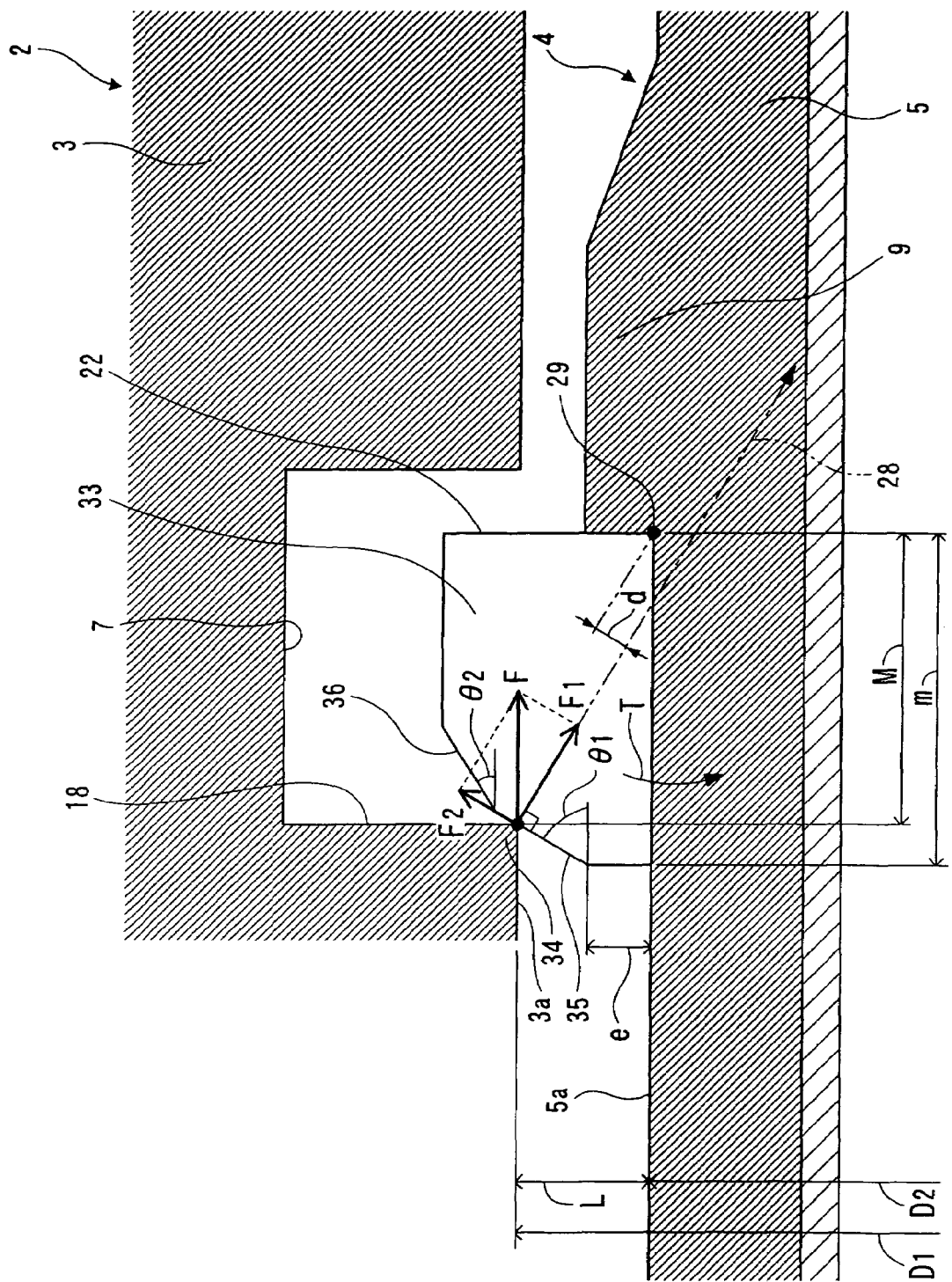
FIG. 8 is a cross sectional view of the main part of a pipe joint with earthquake-proof function of Embodiment 4 of the present invention.
Figure 9:
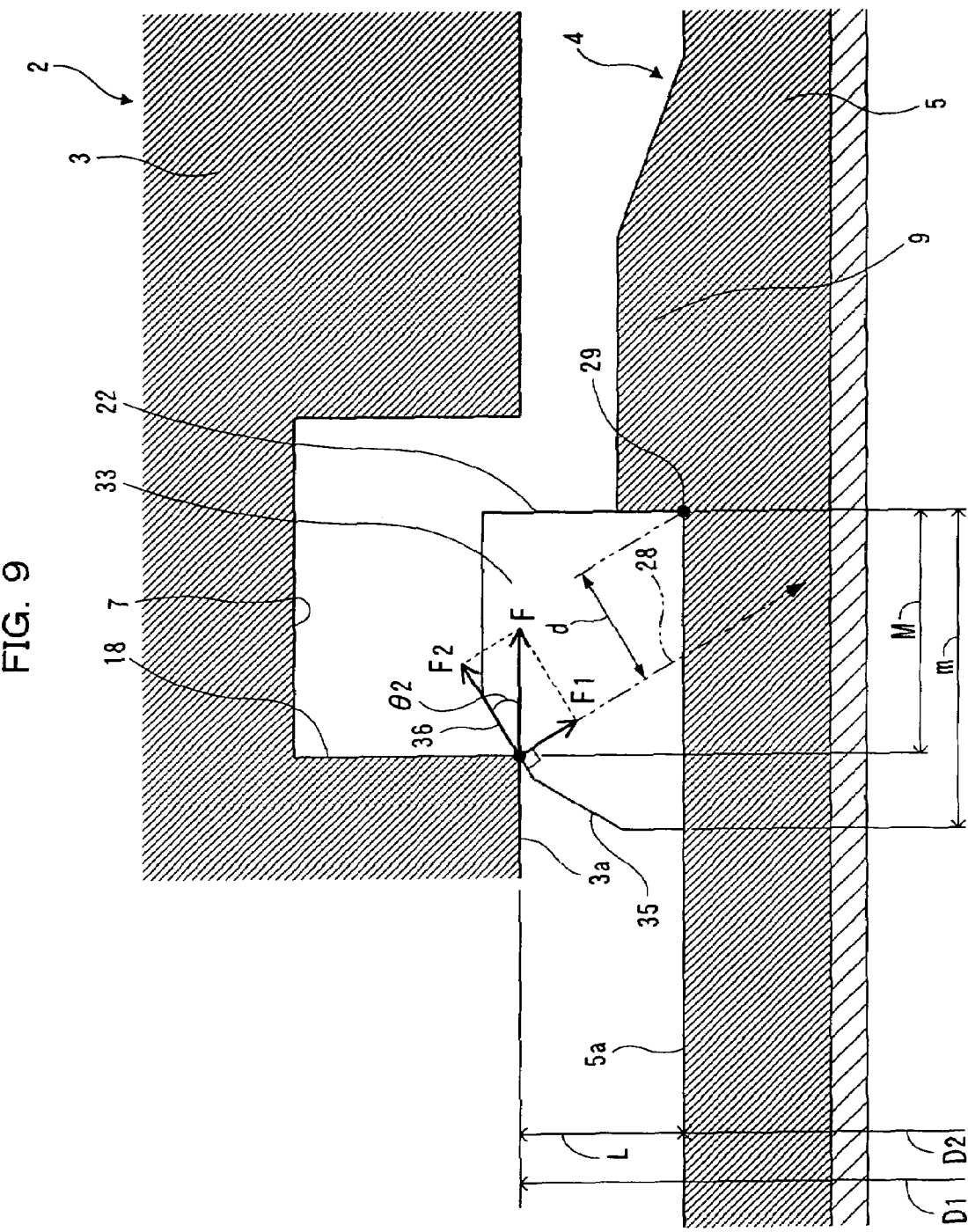
FIG. 9 is a view showing another acting example of the pipe joint of FIG. 8.

As shown in FIGS. 8 and 9, tapered surfaces 35 and 36 that can contact an edge portion 34 and converge toward the opening side of the socket 3 are formed at the part on the opening side of the socket 3 of the lock ring 33 corresponding to the edge portion 34 on the inner circumference side of the side surface 18 of the lock ring accommodating groove 7. The tapered surfaces 35 and 36 are formed so that the tapered surface 35 closer to the opening side of the socket 2 has a greater inclination angle with respect to the pipe axial center than the tapered surface 36 on the inner side of the socket 3 and is formed so that the inclination angle changes in steps.

The inclination angle θ1 of the tapered surface 35 on the distal end side with respect to the pipe axial center is formed so as to satisfy the following inequality:

$$M > L \tan \theta 1 \quad \text{(iv)}$$

wherein L denotes the distance from the inner circumferential surface 3a of the socket 3 to the outer peripheral surface 5a of the spigot, and M is the distance from the edge portion 34 of the lock ring accommodating groove 7 to the contacting point 29.

If only the tapered surface 35 of inclination angle θ1 is present, the following equation may be satisfied:

$$M = L \tan \theta 1 \quad \text{(v)}$$

from the axial direction width m{=[M+(L−e)cot θ1] (e denotes the height of the perpendicular portion of the part formed with the tapered surface 35)} of the lock ring 33 and the relationship between θ1 and L.

With this point as the boundary, the inclination angle θ2 of the other tapered surface 36 is set so as to satisfy the following inequalities:

$$L \tan \theta 1 > L \tan \theta 2 \text{ and } M > L \tan \theta 2.$$

That is, the tapered surfaces 35 and 36 are formed so that the tapered surface 35 with a step inclination angle contacts the edge portion 34, as shown in FIG. 8, when the distance L{=(D1−D2)/2}, wherein D1 denotes the inner diameter of the socket 3 and D2 denotes the outer diameter of the spigot 5, is small, and the tapered surface 46 with a gentle inclination angle contacts the edge portion 34, as shown in FIG. 9, when the distance L is large. Thus not only when the distance L is small, but even if the distance L is large, the line of action 28 of the component force F1 in the direction perpendicular to the tapered surfaces 35 and 36 of the disengagement prevention force F passes the inner circumference side that is outer than the contacting point 29, that is, the opening side of the socket 3 that is positioned outer than the contacting point 29, along the outer peripheral surface 5a of the spigot 5.

With such a configuration, regardless of the size of the distance L from the inner circumferential surface 3a of the socket 3 to the outer peripheral surface 5a of the spigot 5, the line of action 28 of the component force F1 always passes the socket opening side that is outer than the contacting point

29, along the outer peripheral surface 5a of the spigot 5. Thus, the rotating force T=F1·d in a direction not floating from the outer peripheral surface 5a of the spigot 5, that is, in a direction pressing against the outer peripheral surface 5a of the spigot 5 acts on the lock ring 33 around the contacting point 29.

As such, based on the inequality (iv), the lock ring 33 with a small width m in the pipe axial direction can be obtained by adjusting the inclination angles θ1 and θ2 in correspondence to the distance L between the inner circumferential surface 3a of the socket 3 and the outer peripheral surface 5a of the spigot 5.

EMBODIMENT 5

Figure 10:
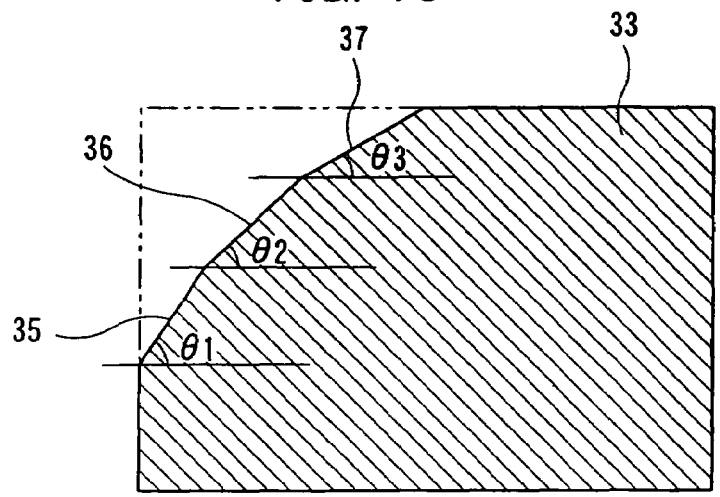
FIG. 10 is a view showing a lock ring of Embodiment 5 of the present invention.

In this embodiment, as shown in FIG. 10, tapered surfaces 35, 36 and 37 of the lock ring 33 are changed in three stages. With such a configuration, the amount of change in the inclination angles θ1, θ2 and θ3 of the tapered surfaces 35, 36 and 37 is made small and is formed in multi-stages, and thus is suitable when the tolerance that is, the change of the L value is large.

EMBODIMENT 6

Figure 11:
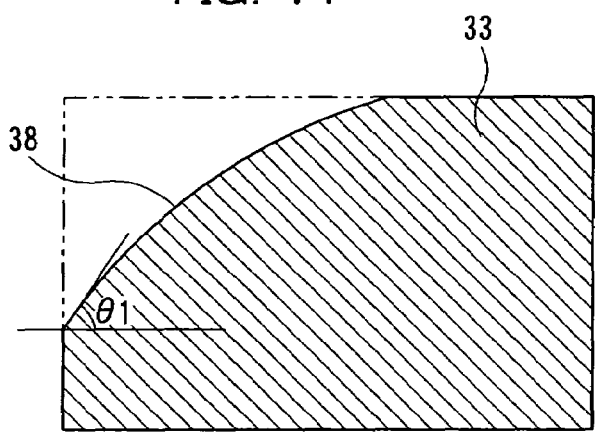
FIG. 11 is a view showing a lock ring of Embodiment 6 of the present invention.

In this embodiment, as shown in FIG. 11, the inclination angle at the inclined portion of the lock ring 33 is further finely changed to form a curved surface 38. The curved surface 38 can be formed, at the transverse cross section thereof, by a simple circular curve, and further, a quadratic curve and the like. In FIG. 11, θ1 denotes the inclination angle at the starting part positioned on the socket opening side of the curved surface 38.

In this case as well, the occurrence of detailed slip-out prevention force and the fall prevention effect of the lock ring can be obtained with respect to the change in the L value.

EMBODIMENT 7

Figure 12:
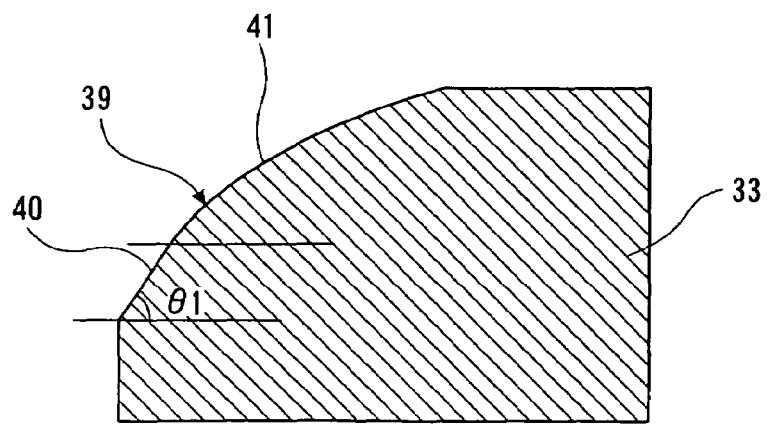
FIG. 12 is a view showing a lock ring of Embodiment 7 of the present invention.

In this embodiment, as shown in FIG. 12, the surface 39 of the inclined portion of the lock ring 33 is formed by a combination of a straight line 40 and a curved line 41 at the transverse cross section. In FIG. 12, θ1 denotes the inclination angle at the portion of the straight line 40.

In this case as well, the occurrence of detailed slip-out prevention force and the fall prevention effect of the lock ring can be obtained with respect to the change in the L value.

EMBODIMENT 8

Figure 13:
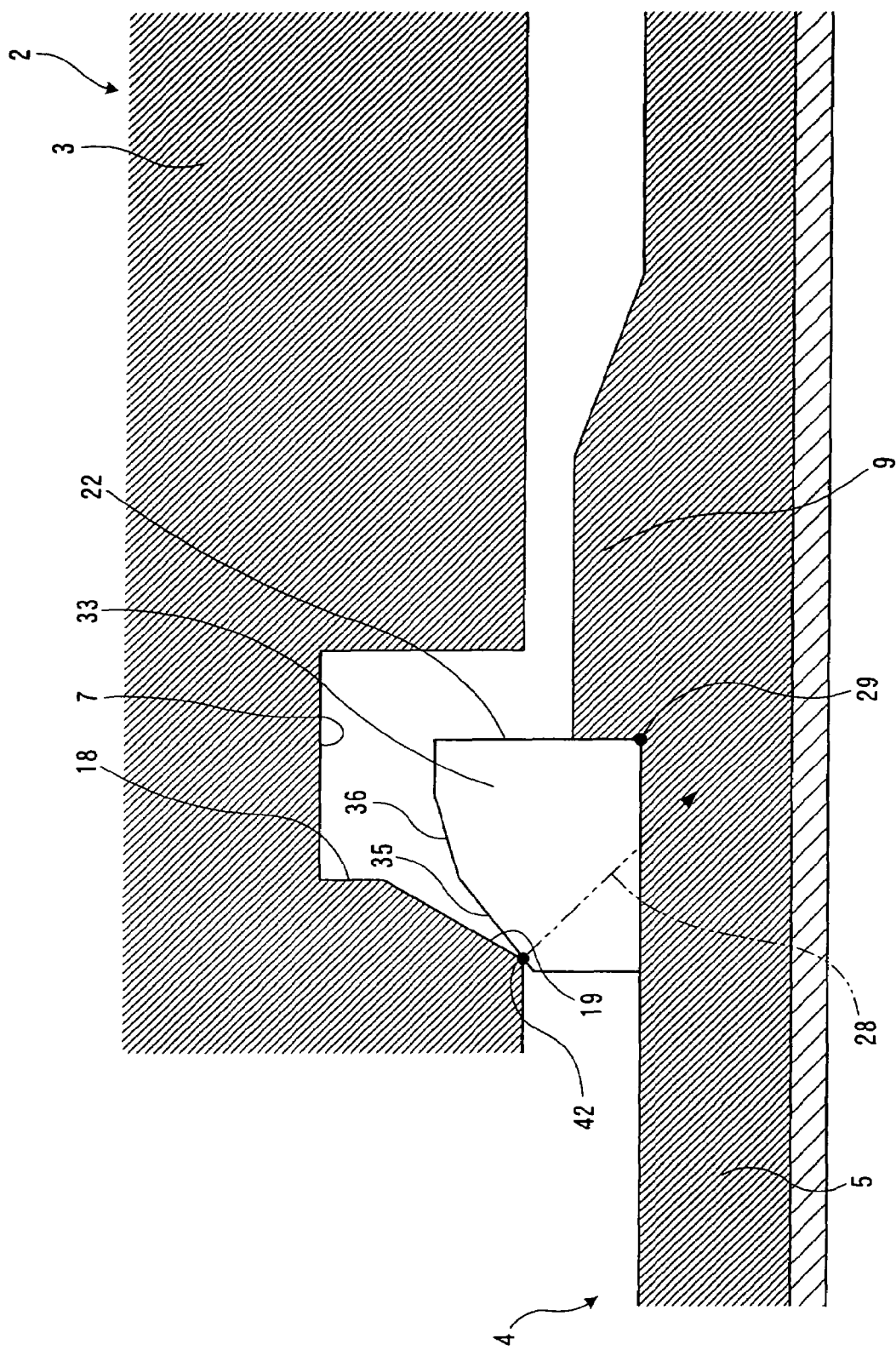
FIG. 13 is a cross sectional view of the main part of a pipe joint with earthquake function of Embodiment 8 of the present invention.

In this embodiment, as shown in FIG. 13, the lock ring 33 is the same as that shown in FIG. 9, but a tapered surface 19 is formed in the lock ring accommodating groove 7. Further, in this embodiment, the inclination angle of the tapered surfaces 35 and 36 of the lock ring 33 and the inclination angle of the tapered surface 19 of the lock ring accommodating groove 7 differ, and an inner circumferential edge portion 42 of the tapered surface 19 contacts the tapered surface 35 of the lock ring 33.

EMBODIMENT 9

Figure 14:
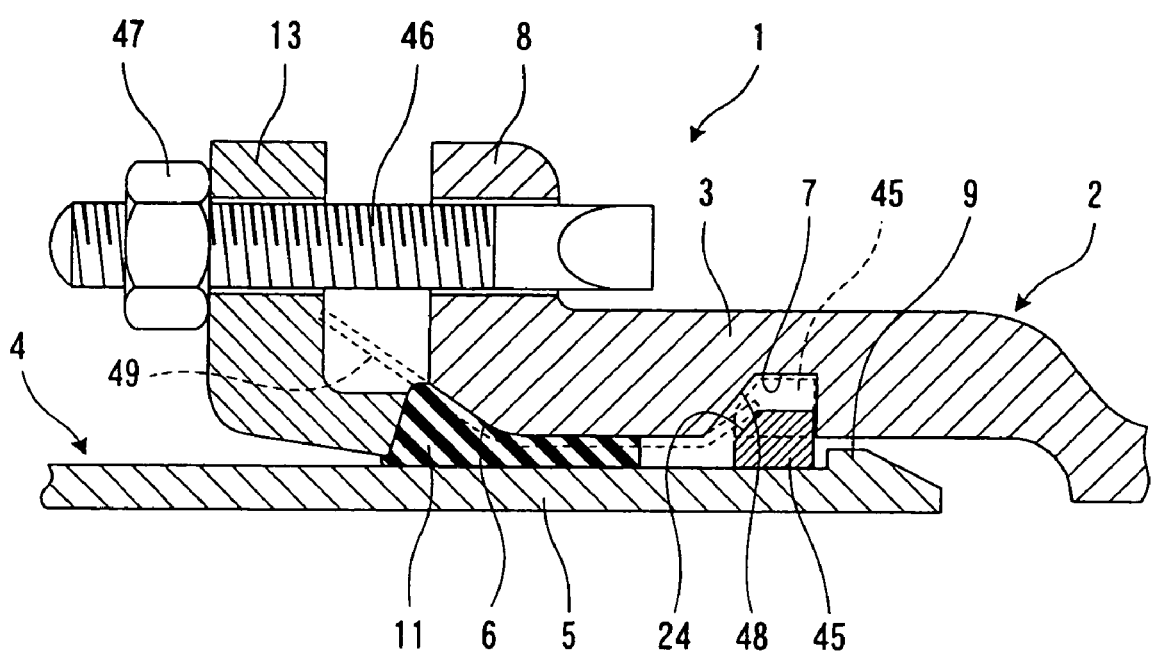
FIG. 14 is a cross sectional view of the main part of a pipe joint with earthquake function of Embodiment 9 of the present invention.

FIG. 14 shows a pipe joint 1 with earthquake-proof function of Embodiment 9 of the present invention. Similar to Embodiments 1 to 8 described above, a spigot 5 formed at the end of one pipe 4 is inserted inside a socket 3 formed at the end of the other pipe 2. In FIG. 14, 6 denotes a sealing material pressing surface and 7 denotes a lock ring accommodating groove. A sealing material 11 is arranged between the sealing material pressing surface 6 and the outer peripheral surface of the spigot 5, and a lock ring 45 made of metal singularly divided in the circumferential direction is accommodated in the lock ring accommodating groove 7. In FIG. 14, 9 denotes a spigot projection. A push ring 13 is externally fitted to the part of the spigot 5 on the external side of the socket 3, and a flange 8 is formed at the end of the socket 3. The push ring 13 is fastened to the flange 8 with a plurality of T-head bolts 46 in the pipe axial direction passing through the flange 8 and the push ring 13 and a nut 47, so that the sealing material 11 is pressed against the pressing surface 6 and the outer peripheral surface of the spigot 5 by the push ring 13, thereby realizing the necessary sealing function.

The side surface on the opening side of the socket 3 of the lock ring accommodating groove 7 is formed as a tapered surface 48 extending from the groove rim part to the groove bottom part. A tapered surface 24 that can contact the tapered surface 48 of the lock ring accommodating groove 7 is formed in the lock ring 45.

In FIG. 14, 49 denotes a diameter expansion holding member of the lock ring 45. The diameter expansion holding member 49 is formed into a plate shape with a metal material and has a constant width along the circumferential direction of the lock ring 45, and the distal end thereof can be inserted to the accommodating groove 7 through a gap between the socket 3 and the spigot 5 before the sealing material 11 is arranged at a predetermined position shown in the figure. When the lock ring 45 singularly divided in the circumferential direction is diameter-expanded using an appropriate tool and the divided part formed at one location in the circumferential direction is expanded beyond the predetermined dimension, the diameter expansion holding member 49 is inserted into the expanded divided part to hold the lock ring 45 in a diameter expanded state.

Figure 15:
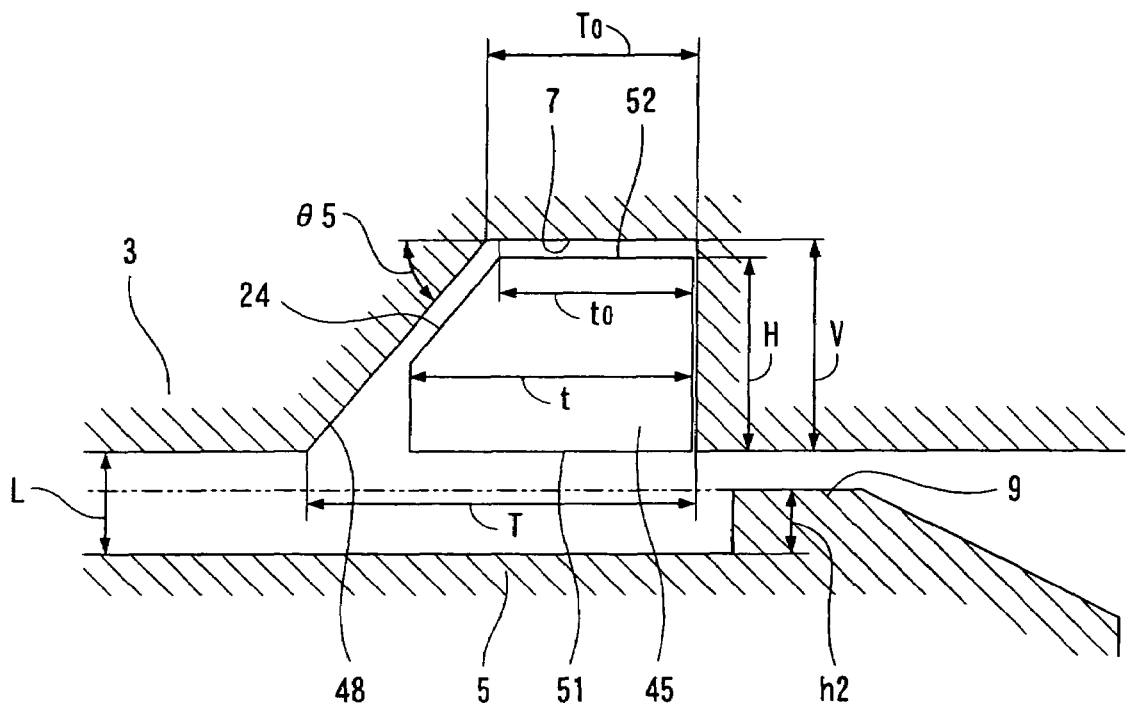
FIG. 15 is a view showing a state in which the lock ring is properly set in the pipe joint of FIG. 14.
Figure 16:
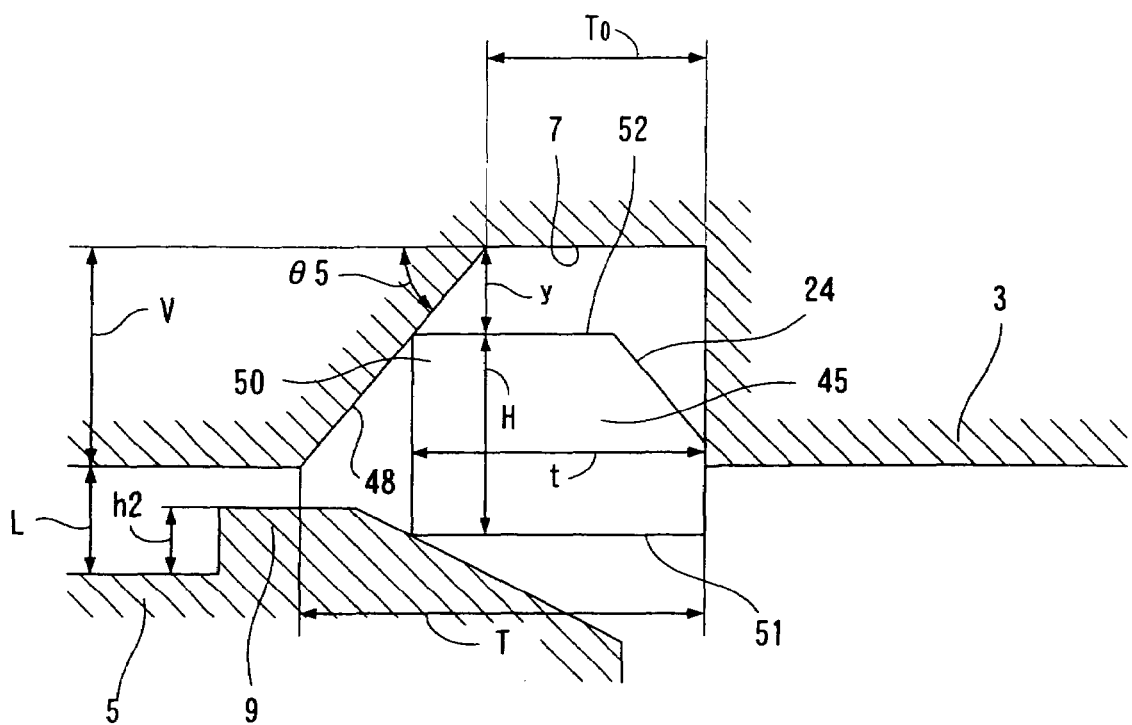
FIG. 16 is a view showing a state in which the lock ring is not properly set in the pipe joint of FIG. 14.

In the pipe joint 1, the relation of the cross sectional shape of the lock ring 45 and the accommodating groove 7 for accommodating the same is as follows. That is, when the tapered surfaces 48 and 24 are faced with respect to each other, the lock ring 45 is accommodated up to the bottom side of the accommodating groove 7 as shown in FIG. 15 and can be held in the diameter expanded state. As a result, when the spigot 5 is inserted into the socket 3 when joining the joint, the spigot projection 9 can pass the position of the lock ring 45 toward the inner side of the socket 3. On the other hand, when the lock ring 45 is arranged in the reverse direction in which the tapered surfaces 48 and 24 do not face with respect to each other as shown in FIG. 16, the tapered surface 48 of the accommodating groove 7 and an edge portion 50 of the non-tapered surface side of the lock ring 45 contact, as shown in the figure, when diameter of the lock ring 45 is to be expanded, and thus the lock ring 45 cannot be accommodated up to the bottom side of the accommodating groove 7 in a diameter expanded state. Therefore, the lock ring 45 has the inner circumferential part thereof protruding inward in the radial direction from the accommodating groove 7, and the spigot projection 9 engages at the protruding portion when inserting the spigot 5 as shown in the figure, thereby prohibiting the spigot 5 from being inserted into the socket 1.

More specifically, as shown in FIG. 15, assume that the width in the pipe axial direction of the inner circumferential surface 51 of the lock ring 3 is t, the width in the pipe axial direction of the outer peripheral surface 52 of the lock ring 3 is $t_0$, the height of the lock ring 3 is H, the opening width of the accommodating groove 7 is T, the width in the pipe axial direction of the bottom surface of the accommodating surface 7 is $T_0$, the inclination angle of the tapered surface 48 with respect to the pipe axial center is θ5, the depth of the accommodating groove 7 is V, the height of the insertion projection 9 is h2, and the dimension of the gap between the inner circumference of the socket 3 and the outer periphery of the spigot 5 is L. If the lock ring 45 is accommodated in the groove 7 with the tapered surfaces 48 and 24 faced with respect to each other as shown in the figure, the spigot projection 9 can pass the inner circumference of the lock ring 45 when inserting the spigot 5 into the socket 3, and thus the condition in such state is as follows:

$$L+V>H+h2 \quad \text{(vi)}$$

The condition for the spigot projection 9 to engage with the lock ring 45 when the spigot 5 attempts to slip out from the socket 3 is as follows:

$$H>L \quad \text{(vii)}$$

The condition for the lock ring 45 to be accommodated up to the bottom part of the accommodating groove 7 when diameter of the lock ring 45 is expanded is as follows:

$$t_0<T_0 \quad \text{(viii)}$$

On the other hand, if the lock ring 3 is accidentally arranged in the reverse direction as shown in FIG. 16, the edge portion 50 contacts the tapered surface 48 of the accommodating groove 7 even if the diameter of the lock ring 50 is expanded, and thus the lock ring 45 cannot be inserted up to the bottom part of the accommodating groove 7. As a result, the spigot projection 9 is obstructed by the lock ring 45 and cannot pass the position thereof when inserting the spigot 5 to the socket 3. The condition for inhibiting the passing of the lock ring is as follows:

$$t>T_0 \quad \text{(ix)}$$

Assuming the gap between the outer peripheral surface of the lock ring 45 and the bottom surface of the accommodating groove 7 of when the spigot projection 9 contacts the lock ring 45 and the passing thereof is inhibited is y, the following relationship is satisfied:

$$y=(t-T_0)\tan θ5 \quad \text{(x)}$$

As the lock ring 45 engages with the spigot projection 9, thereby preventing any further insertion of the spigot 5 to the inside of the socket 3, the following relational expression:

$$(L+V)-(y+H)<h2$$

or $$(L+V)-(t-T_0)\tan θ5-H<h2 \quad \text{(xi)}$$

is satisfied.

Therefore, in inserting the lock ring 45 to the accommodating groove 7, if arranged in the proper direction, the lock ring 45 is properly accommodated inside the accommodating groove 7 in a state diameter expanded by the diameter expansion holding member 49 as shown in FIG. 14, and the spigot projection 9 can reliably enter toward the inner side of the socket 3 of the accommodating groove 7 as shown in FIG. 15. However, if arranged in the reverse direction as shown in FIG. 16, the tapered surface 48 of the accommodating groove 7 and the edge portion 50 of the lock ring 45 contact and the lock ring 45 cannot fully enter the accommodating groove 7. As a result, the spigot projection 9 cannot pass the inside of the lock ring 45, and the spigot 5 cannot be inserted-to a predetermined position inside the socket 3.

The misconnection can be thereby reliably prevented.

In terms of dimensional tolerance of the pipe, even with the above configuration, a case in which the lock ring 45 arranged in the reverse direction enters the accommodating groove 7 is conceivable. When such dimensional relationship exists, the spigot projection 9 can be reliably prevented from passing by increasing the dimension H shown in FIG. 16 so that the protruding amount of the lock ring 45 from the inner circumferential surface of the socket 3 of when the lock ring 45 is inserted in the reverse direction becomes large.

Figure 17:
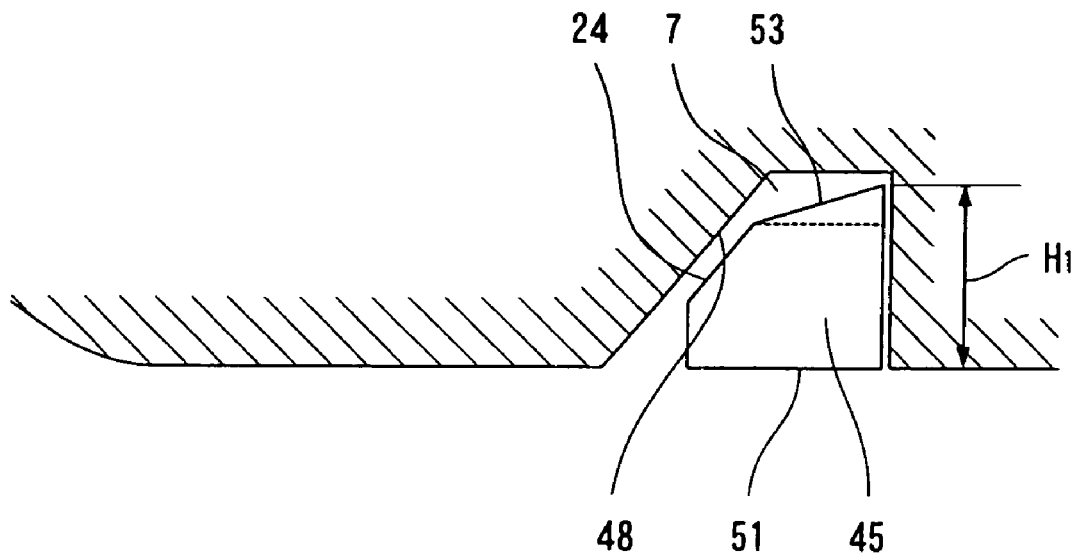
FIG. 17 is a view showing a state in which the lock ring is properly set in a modification of the pipe joint with earthquake function of Embodiment 9 of the present invention.
Figure 18:
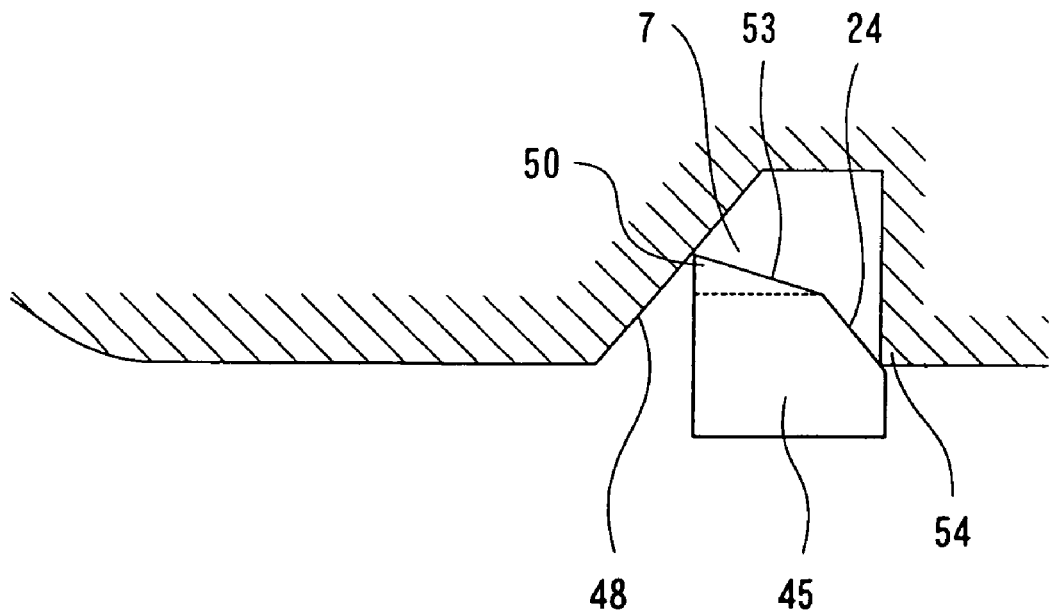
FIG. 18 is a view showing a state in which the lock ring is not properly set in the modification.

In this case, as shown in FIG. 17, a separate tapered surface 53 continuing from the tapered surface 24 may be formed to obtain height $H_1$. When the tapered surface 53 is formed, as shown in FIG. 18, the edge portion 50 of the lock ring 3 engages with the tapered surface 48 of the accommodating groove 7 by height $H_1$ and an inner circumferential edge portion 54 at the side surface on the inner side of the accommodating groove 7 engages with the tapered surface 24 of the lock ring 45; thus, misconnection of the spigot 5 is reliably prevented.

EMBODIMENT 10

Embodiment 10 is similar to the case of Embodiment 9, but the inner diameter of the lock ring 45 in a natural state is formed so as to be similar to the outer diameter of the spigot 5.

Figure 19:
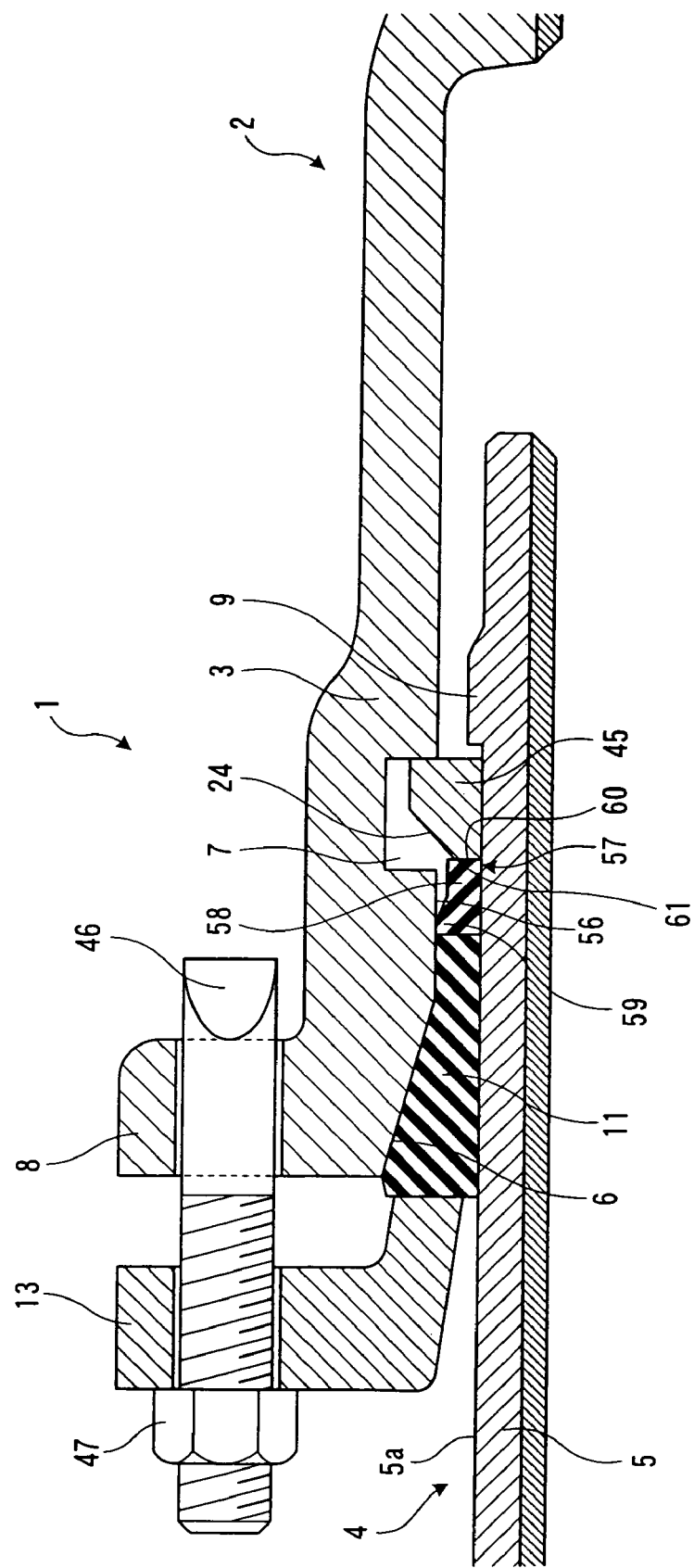
FIG. 19 is a cross sectional view of the main part of a pipe joint with earthquake function of Embodiment 10 of the present invention.

As shown in FIG. 19, different from Embodiment 9, the transverse cross section shape of the accommodating groove 7 is rectangular, and the accommodating groove 7 does not have a tapered surface. An inner circumferential surface 56 in the pipe axial direction is arranged on the inner circumference of the socket 3 between the sealing material pressing surface 6 and the lock ring accommodating groove 7. A backup ring 57 made of rubber harder than the sealing material 11 is arranged between the inner circumferential surface 56 of the socket 3 and the outer peripheral surface 5a of the spigot 5 at between the sealing material 11 and the lock ring 45 in a state pressing against the outer peripheral surface 5a of the spigot 5.

Figure 20:
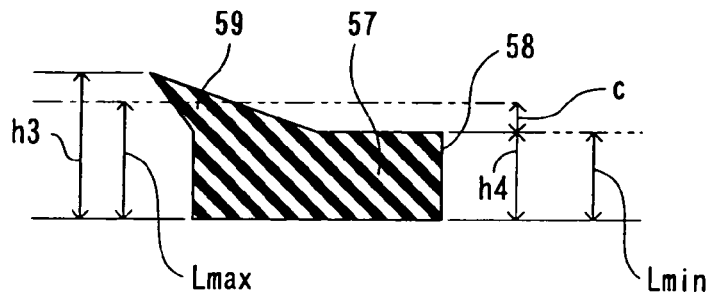
FIG. 20 is a cross sectional view of a backup ring of FIG. 19.

The backup ring 57, as shown in FIGS. 19 and 20, has a configuration integrally including a small diameter part 58 formed so as to be arranged on the inner circumference side of the inner circumferential surface 56 and a large diameter part 59 formed so as to have a greater diameter than the small diameter part 58 and to prevent the sealing material 11 compressed between the socket and the spigot from entering a gap c between the inner circumferential surface 56 and the small diameter part 58. More specifically, as shown in FIG. 20, the large diameter part 59 acting as a projecting part has a configuration formed projecting outward in the pipe diameter direction from the outer periphery on the socket opening side of the small diameter part 58 acting as a main body part. The end face 60 on the socket inner side of the backup ring 57 is formed in the pipe diameter direction, and can contact the end face 61 on the socket opening side of the lock ring 45.

The height h3 in the pipe diameter direction from the inner circumferential surface of the backup ring 45 to the maximum outer diameter portion of the large diameter part 59 is formed slightly larger than a maximum gap Lmax between the inner circumferential surface 56 and the outer peripheral surface 5a of the spigot 5 of when the socket 3 has the maximum allowable dimension and the spigot 5 has the minimum allowable dimension. The height h4 of the small diameter part 58 is, for example, formed similar to the size of a minimum gap Lmin between the inner circumferential surface 56 and the outer peripheral surface 5a of the spigot 5 of when the socket 3 has the minimum allowable dimension and the spigot 5 has the maximum allowable dimension.

In such a configuration, when joining the socket 3 and the spigot 5, the spigot 5 in a state arranged with the backup ring 18, the sealing material 11 and the push ring 13 on the outer periphery is inserted to a predetermined position inside the socket 3 in a state the lock ring 45 is accommodated in the lock ring accommodating groove 7. The push ring 13 is fastened to the flange 8 by the T-head bolt 46 and the nut 47.

Figure 21A:
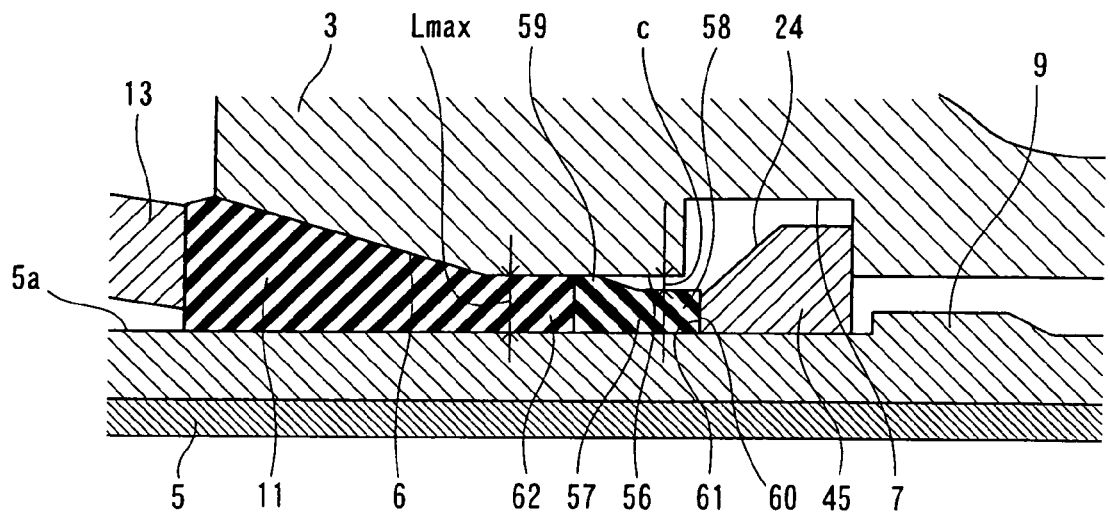
FIG. 21A is a view showing an example of how the backup ring of FIG. 20 is used.

Even if the gap between the inner circumferential surface 56 and the outer peripheral surface 5a of the spigot 5 is the maximum gap Lmax as shown in FIG. 21A, the large diameter part 59 can be pressed against the inner circumferential surface 56 by elastic deformation since the height h3 of the large diameter part 59 in the backup ring 57 is formed greater than the maximum gap Lmax as shown in FIG. 20. Therefore, the backup ring 57 can be arranged at the portion of the maximum gap Lmax so that the gap is not created between the large diameter part 59 and the inner circumferential surface 56 across the entire circumference thereof. Thus, a soft bulb part 62 at the distal end of the sealing material 11 in the compressed state is reliably prevented from entering into the gap c between the inner circumferential surface 56 and the small diameter part 58 by the large diameter part 59, and the sealing function between the socket 3 and the spigot 5 that occurs when the compressed state of the bulb part 62 is relaxed can be reliably prevented from lowering.

Figure 21B:
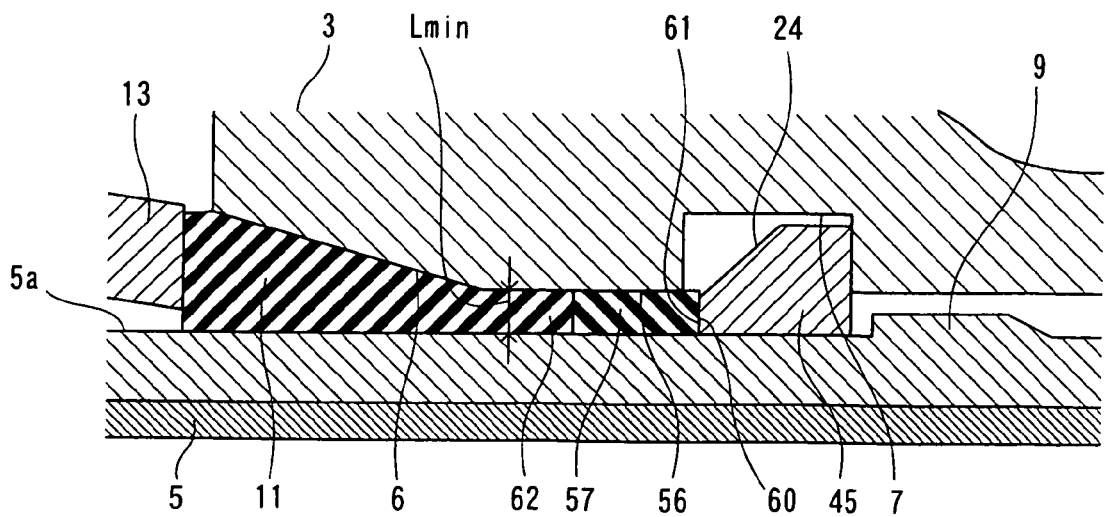
FIG. 21B is a view showing another example of how the backup ring of FIG. 20 is used.

Further, even if the gap between the inner circumferential surface 56 and the outer peripheral surface 5a of the spigot 5 is the minimum gap Lmin as shown in FIG. 21B, the backup ring 57 can be arranged at the minimum gap Lmin so that the gap is not created between the backup ring 57 and the inner circumferential surface 56 across the entire circumference thereof since the large diameter part 59 at the backup ring 57 made of hard rubber contacts the inner circumferential surface 56 and deforms. Thus, the bulb part 62 is again reliably prevented from entering into the gap between the inner circumferential surface 56 and the small diameter part 58 by the large diameter part 59, and the sealing function between the socket and the spigot can be reliably prevented from lowering.

Similarly, even if the gap L between the inner circumferential surface 56 and the outer peripheral surface 5a of the spigot 5 is an arbitrary size of between Lmin and Lmax, the gap between the inner circumferential surface 56 and the backup ring 57, that is, the large diameter part 59 thereof can be reliably prevented from being created.

Figure 22:
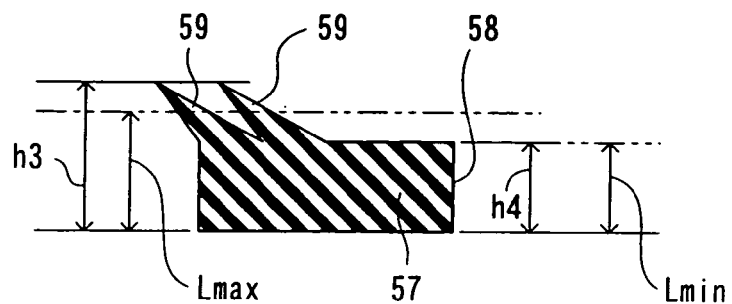
FIG. 22 is a view showing a modification of the backup ring of Embodiment 10.
Figure 23:
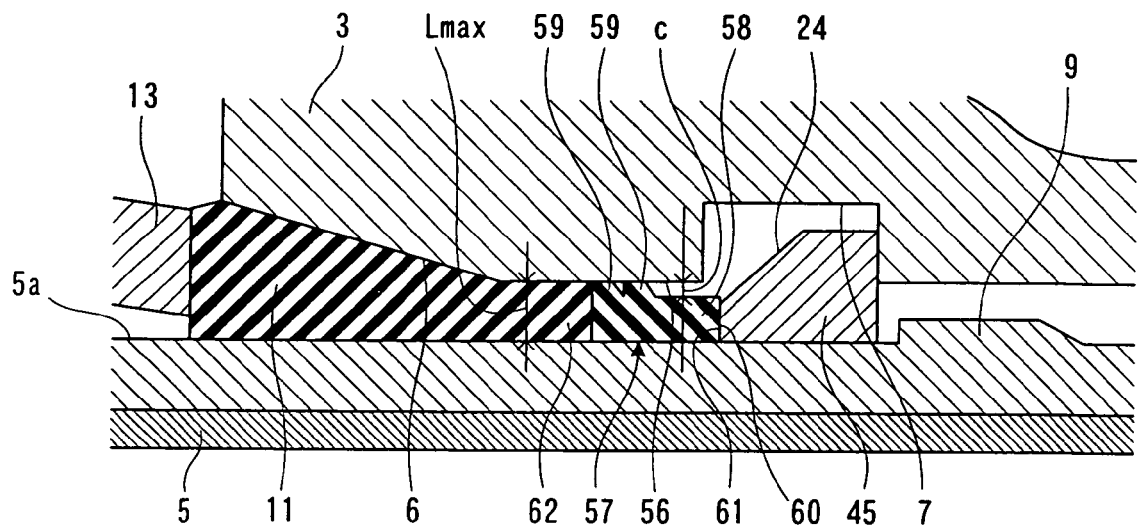
FIG. 23 is a view showing an example of how the backup ring of FIG. 22 is used.

In FIGS. 19 to 21B, the large diameter part 59 of the backup ring 57 is formed projecting outward in the radial direction from one location on the outer periphery on the socket opening side of the small diameter part 58, but the large diameter part 59 may be formed projecting outward in the radial direction from a plurality of locations on the outer periphery on the socket opening side of the small diameter part 58, for example, at two locations on the outer periphery on the socket opening side of the small diameter part 58, as shown in FIG. 22. The cross sectional configuration of the pipe joint using such backup ring 57 is shown in FIG. 23.

Consequently, the soft bulb part 62 at the distal end of the sealing material 11 in a compressed state is further reliably prevented from entering the gap c between the inner circumferential surface 56 and the small diameter part 58.

Figure 24:
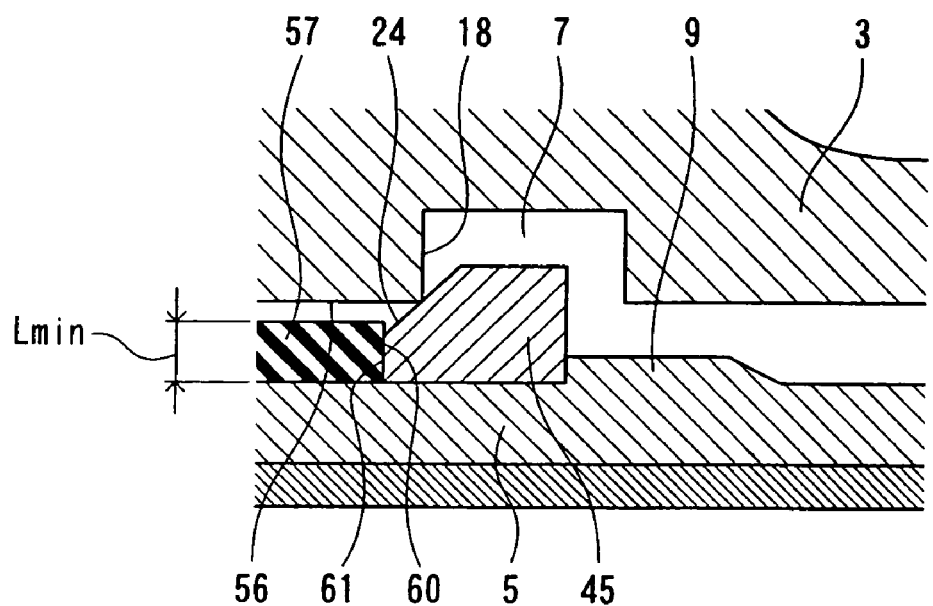
FIG. 24 is a view showing a function example of the lock ring of Embodiment 10.
Figure 25:
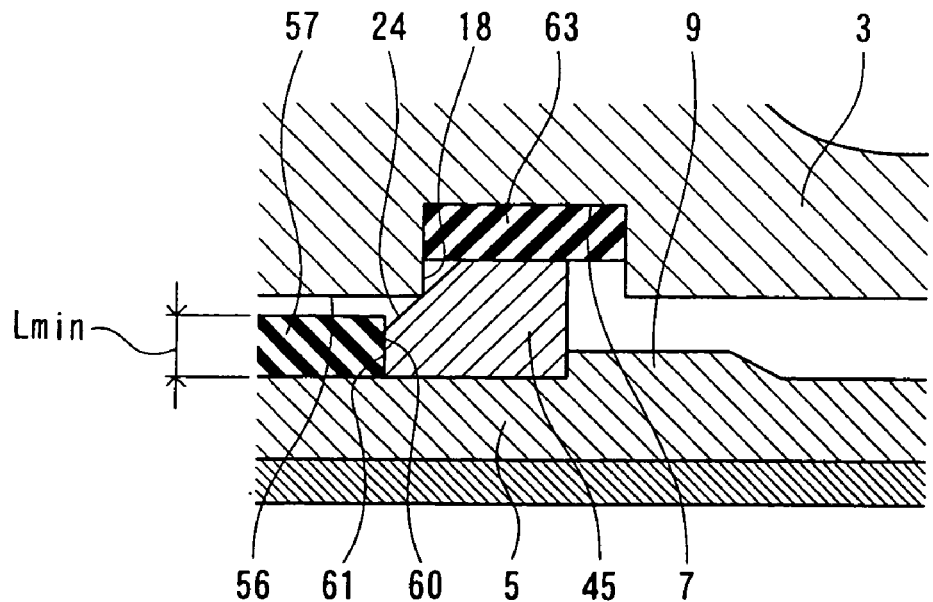
FIG. 25 is a view showing another modification of Embodiment 10.

When a slip-out force acts between the socket and the spigot, the tapered surface 24 of the lock ring 45 contacts the inner circumferential edge portion at the side surface 18 of the accommodating groove 7 (similar to that shown in FIG. 3), but the portion on the socket opening side of the lock ring 45 can enter the gap between the inner circumferential surface 56 and the outer periphery 5a of the spigot 5, and the gap can be blocked across the entire circumference by the lock ring 45, as shown in FIG. 24. Further, as shown in FIG. 25, a centering rubber ring 63 that allows the lock ring 45 to be centered with respect to the socket 3 and the spigot 5 when inserting the spigot 5 into the socket 3 may be arranged between the outer periphery of the lock ring 45 and the bottom part of the accommodating groove 7.

EMBODIMENT 11

Figure 26:
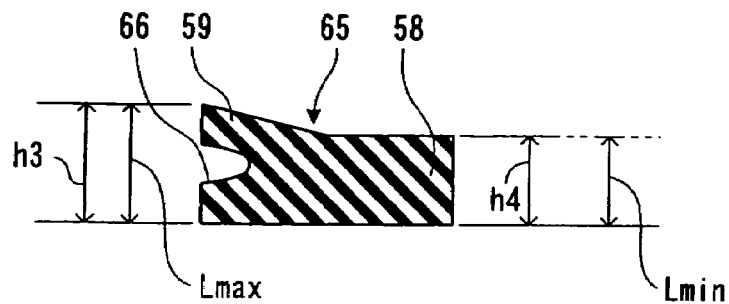
FIG. 26 is a cross sectional view of the backup ring in a pipe joint with earthquake function of Embodiment 11 of the present invention.

The pipe joint of Embodiment 11 has a structure that the backup ring 57 in the pipe joint of Embodiment 10 is replaced by a backup ring 65 shown in FIG. 26. The configuration of the other parts is the same as the pipe joint of Embodiment 10.

More specifically, the backup ring 65 has the large diameter part 59 acting as a projecting part projecting outward in the radial direction from the outer periphery on the socket opening side of the small diameter part 58 acting as the main body part. A concave part 66 serving as a cut-out part opened toward the socket opening side is formed across the entire circumference at the end on the socket opening side of the backup ring 19.

Figure 27A:
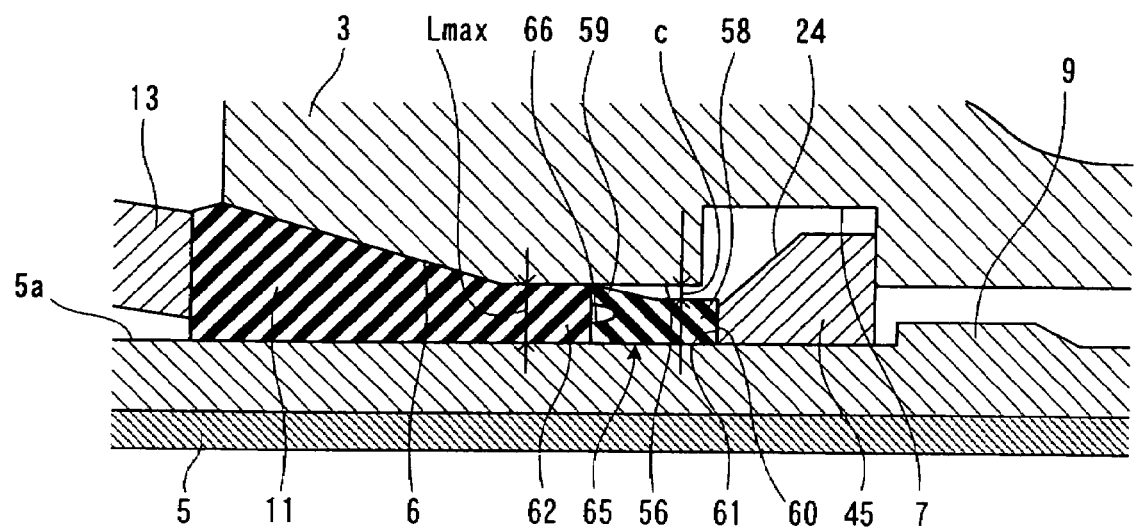
FIG. 27A is a view showing an example of how the backup ring of FIG. 26 is used.

FIG. 27A shows a case in which the gap between the inner circumferential surface 56 of the socket 3 and the outer peripheral surface 5a of the spigot 5 is the maximum gap Lmax. In this case, the height h3 of the large diameter part 59 of the backup ring 65 is formed so as to be slightly larger than the maximum gap Lmax based on the dimensional tolerance; thus, no gap is created between the large diameter part 59 and the inner circumferential surface 56 across the entire circumference thereof.

Figure 27B:
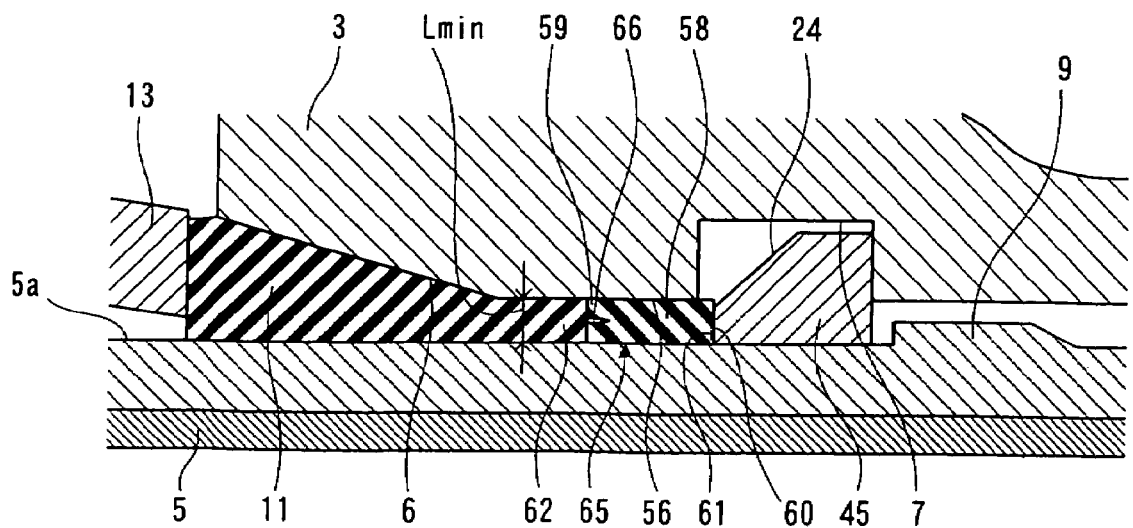
FIG. 27B is a view showing another example of how the backup ring of FIG. 26 is used.

FIG. 27B shows a case in which the gap between the inner circumferential surface 56 of the socket 3 and the outer peripheral surface 5a of the spigot 5 is the minimum gap Lmin. In this case, the large diameter part 59 of the backup ring 65 made of hard rubber is pressed against the inner circumferential surface 56 and is deformed, and the large diameter part 59 can be easily deformed as the concave part 66 is squashed in the radial direction with the deformation of the large diameter part 59, as shown in the figure.

Therefore, even if the gap between the inner circumferential surface 56 of the socket 3 and the outer peripheral surface 5a of the spigot 5 is an arbitrary value taken between Lmin and Lmax, the gap can be reliably prevented from creating between the inner circumferential surface 56 and the backup ring 65, that is, the large diameter part 59 thereof since the large diameter part 59 of the backup ring 65 deforms when contacting the inner circumferential surface 56.

Here, even if the pressing force toward the inner side of the socket 3 further acts on the backup ring 65, the compressed state of the bulb part 62 of the sealing material 11 is not unnecessarily relaxed; thus, the sealing function between the socket and the spigot can be reliably prevented from lowering.

EMBODIMENT 12

Figure 28:
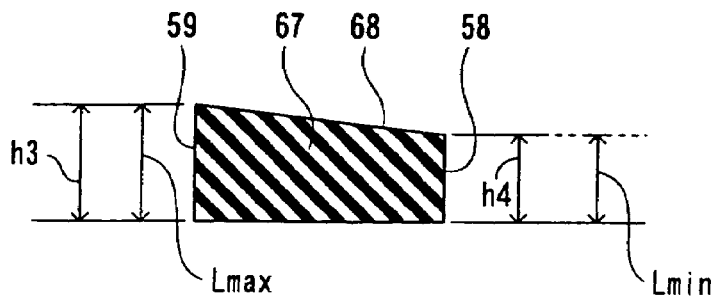
FIG. 28 is a cross sectional view of the backup ring in a pipe joint with earthquake function of Embodiment 12 of the present invention.

A pipe joint of Embodiment 12 has a structure that the backup ring 57 or 65 in the pipe joint of Embodiment 10 or 11 is replaced by a backup ring 67 shown in FIG. 28. The configuration of the other parts is the same as the pipe joints of Embodiments 10, 11.

More specifically, the backup ring 67 is formed with a tapered surface 68, which diameter gradually becomes smaller from the large diameter part 59 toward the small diameter part 58, on the outer periphery from one end to the other end in the axial direction, as shown in FIG. 28.

Figure 29A:
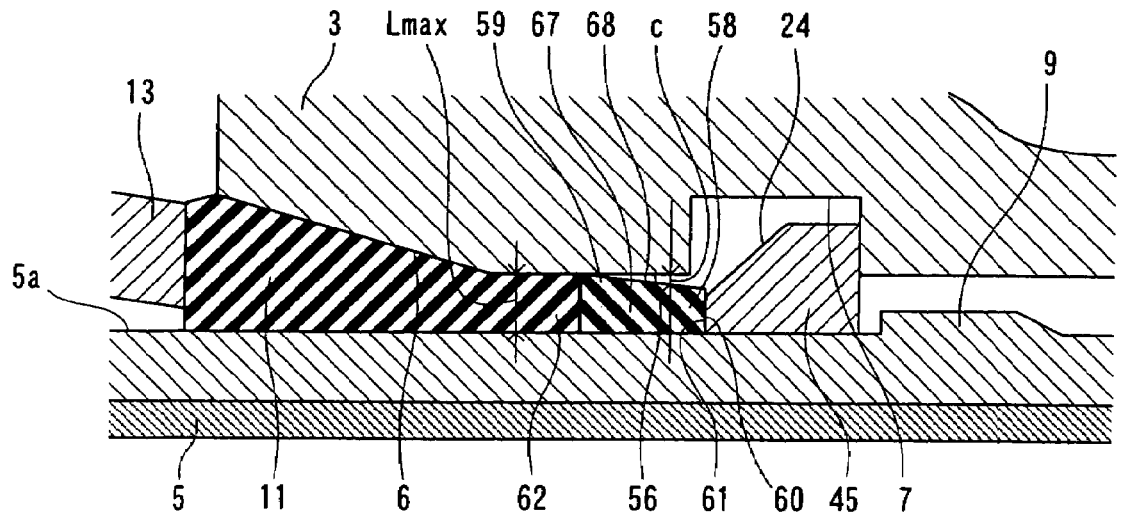
FIG. 29A is a view showing an example of how the backup ring of FIG. 28 is used.

FIG. 29A shows a case in which the gap between the inner circumferential surface 56 of the socket 3 and the outer peripheral surface 5a of the spigot 5 is the maximum gap Lmax. In this case, the height h3 of the large diameter part 59 of the backup ring 67 is formed so as to be slightly larger than the maximum gap Lmax based on the dimensional tolerance; thus, no gap is created between the large diameter part 59 and the inner circumferential surface 56 across the entire circumference thereof.

Figure 29B:
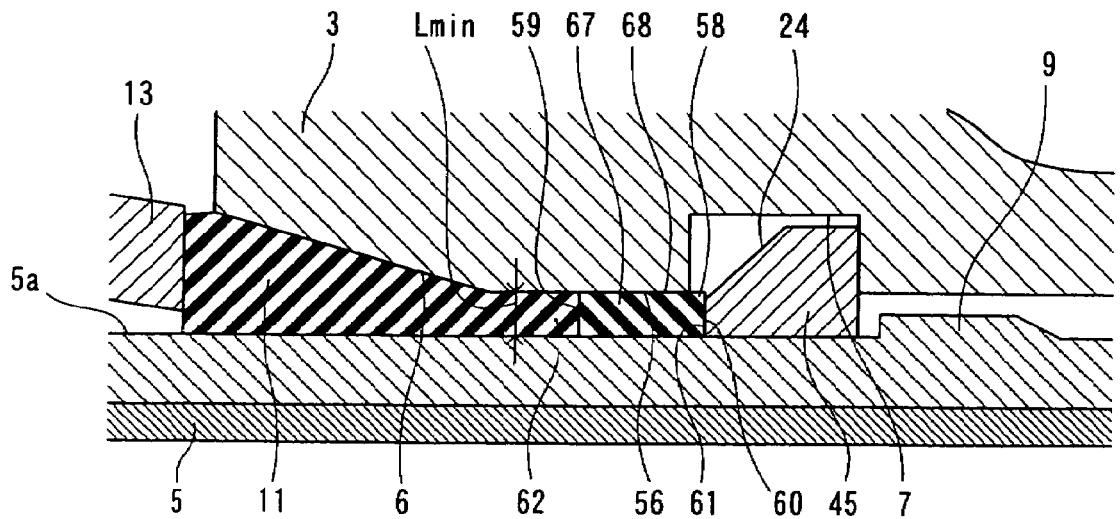
FIG. 29B is a view showing another example of how the backup ring of FIG. 28 is used.

FIG. 29B shows a case in which the gap between the inner circumferential surface 56 of the socket 3 and the outer peripheral surface 5a of the spigot 5 is the minimum gap Lmin. In this case, the backup ring 67 can deform when the tapered surface 68 of the backup ring 67 made of hard rubber presses against the inner circumferential surface 56. No gap thus is created between the inner circumferential surface 56 and the backup ring 67 across the entire circumference thereof.

Therefore, even if the gap between the inner circumferential surface 56 of the socket and the outer peripheral surface Sa of the spigot 5 is an arbitrary value taken between Lmin and Lmax, the gap can be reliably prevented from creating between the inner circumferential surface 56 and the backup ring 67, that is, the tapered surface 68 thereof.

Figure 30:
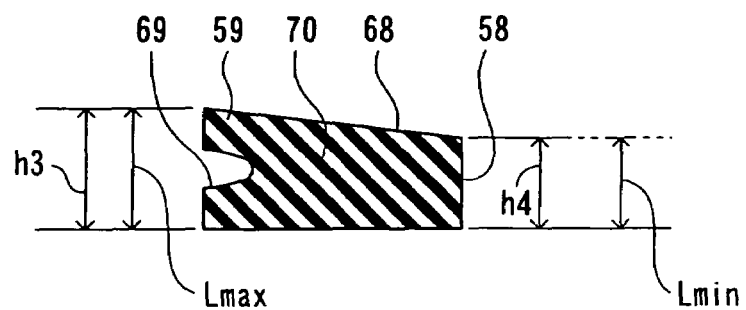
FIG. 30 is a cross sectional view of a backup ring of a modification of Embodiment 12.

As shown in FIG. 30, as a modification of Embodiment 12, a different backup ring 70 in which a concave part 69 acting as a cut-out part opened toward the socket opening side is formed across the entire circumference may be applied to the end on the socket opening side of the backup ring 67 of FIG. 28.

Figure 31:
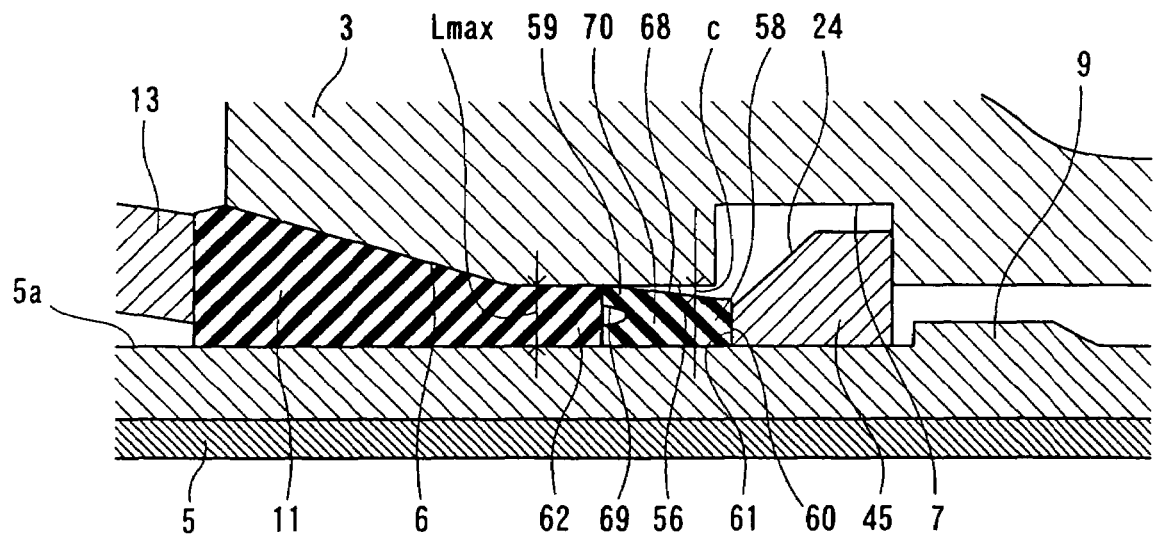
FIG. 31 is a view showing an example of how the backup ring of FIG. 30 is used.

In this case, similar to the case of Embodiment 11, the large diameter part 59 of the backup ring 70 can easily deform as the concave part 69 is squashed in the radial direction. FIG. 31 shows a case in which the gap between the inner circumferential surface 56 of the socket 3 and the outer peripheral surface 5a of the spigot 5 is the maximum gap Lmax in the pipe joint using the backup ring 70.

TEST RESULTS FOR EMBODIMENTS 10 to 12

Figure 32:
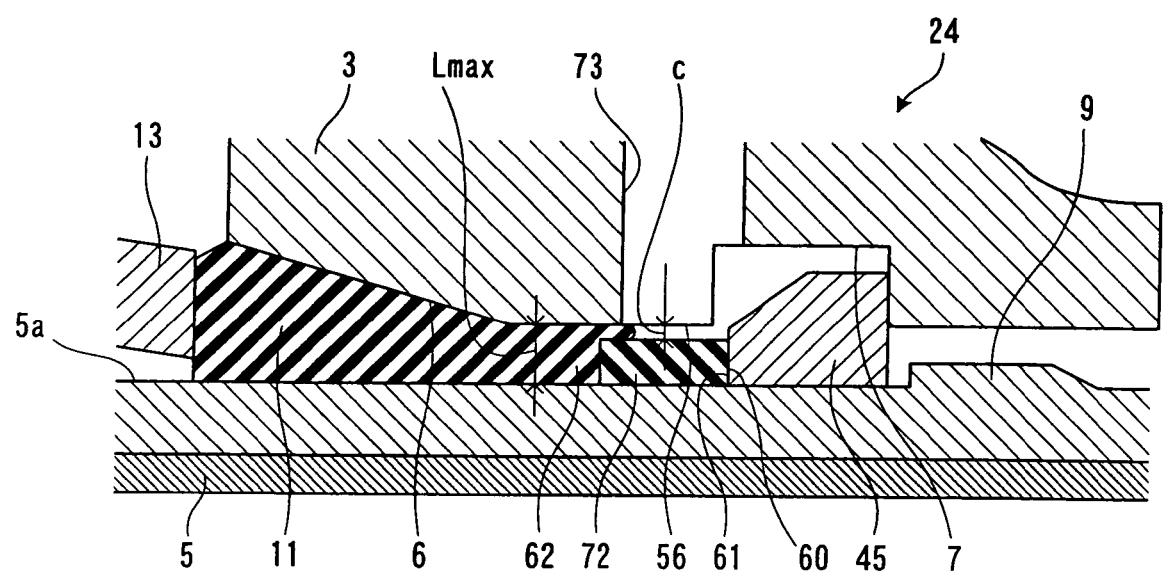
FIG. 32 is a cross sectional view of the main part of a conventional pipe joint with earthquake function.

FIG. 32 shows a structure of a conventional pipe joint with respect to the pipe joints of Embodiments 10 to 12. Here, the backup ring 72 is formed so that the transverse cross section is simply a rectangle, and is formed so that the thickness thereof is the same as the minimum gap Lmin so as to be arranged without trouble even if the gap between the inner circumferential surface 56 of the socket 3 and the outer peripheral surface 5a of the spigot 5 is a minimum gap Lmin. FIG. 32, on the other hand, shows a case in which the gap between the inner circumferential surface 56 of the socket 3 and the outer peripheral surface 5a of the spigot 5 is the maximum gap Lmax. In this case, the gap c in the radial direction is created between the inner circumferential surface 56 and the backup ring 72. However, a means for blocking the gap c does not exist in the configuration shown in the figure; thus, the bulb part 62 of the sealing material 11 enters the gap c and the compressing state of the bulb part 62 relaxes, thereby lowering the sealing function between the socket and the spigot.

In the pipe joint shown in FIG. 32, an observation hole 73 for observing whether or not the bulb part 62 of the sealing material 11 in the compressed state enters the gap c between the inner circumferential surface 56 and the backup ring 72 is formed through the tube wall of the socket 3 in the radial direction.

In the tests described below, the shape of the backup ring 72 having a transverse cross section of a rectangular shape shown in FIG. 32 is referred to as A, the shape of the backup ring 57 shown in FIG. 20 is referred to as B, the shape of the backup ring 57 shown in FIG. 22 is referred to as C, the shape of the backup ring 65 shown in FIG. 26 is referred to as D, the shape of the backup ring 67 shown in FIG. 28 is referred to as E, and the shape of the backup ring 70 shown in FIG. 30 is referred to as F. The following Tests 1 to 3 were then carried out.

First, as Test 1, a test on whether or not the bulb part 62 of the sealing material 11 in the compressed state enters the gap c between the inner circumferential surface 56 of the socket 3 and the backup ring 72, 57, 57, 65, 67 or 70 when the gap between the inner circumferential surface 56 of the socket 3 and the outer peripheral surface 5a of the spigot 5 is the maximum gap Lmax was carried out using the pipe joint shown in FIG. 32 and pipe joints with the observation hole formed therethrough, similar to the pipe joint shown in FIG. 32.

Next, as Test 2, a test on whether or not the backup ring 72, 57, 57, 65, 67 or 70 is smoothly arranged in the gap when joining the socket 3 and the spigot 5 if the gap between the inner circumferential surface 56 of the socket 3 and the outer peripheral surface 5a of the spigot 5 is a minimum gap Lmin was carried out.

Next, as Test 3, a test on whether or not water leakage is recognized in the joint when loading a predetermined test water pressure from the interior side of the pipe of the joint when the gap between inner circumferential surface 56 of the socket 3 and the outer peripheral surface 5a of the spigot 5 is the maximum gap Lmax was carried out.

The results of Test 1 to 3, and the costs of the backup rings 72, 57, 57, 65, 67 and 70 of the respective shapes A to F with the cost of the backup ring 72 of the shape A as 100 are summarized in table 1.

| Shape | Test 1 | Test 2 | Test 3 | Cost |
| --- | --- | --- | --- | --- |
| A | Enter | Smoothly arranged | Leakage recognized | 100 |
| B | No enter | Smoothly arranged | No leakage recognized | 126 |
| C | No enter | Smoothly arranged | No leakage recognized | 126 |
| D | No enter | Smoothly arranged | No leakage recognized | 116 |
| E | No enter | Not smoothly arranged | No leakage recognized | 117 |
| F | No enter | Smoothly arranged | No leakage recognized | 117 |

As apparent from the above results, in terms of performance and cost, the cases using the backup rings 65 and 70 of the shapes D and F are most suitable. It is to be noted that for the backup rings 65 and 70 of the shapes D and F, Tests 1 and 3 were again carried out under special conditions such as the following Conditions 1 to 3.

First, as Condition 1, of the plurality of T-head bolts 46 in the circumferential direction, the nut 47 was screw-fit to the half thereof when the pipe was arranged in the horizontal direction, for example, to the T-head bolt 46 on the pipe top half-circumference side at a predetermined torque, and the nut 47 was not screw-fit to the T-head bolt 46 on the other half on the tube bottom half-circumference side, or a so-called half-tightening was performed, so that the location compressed with a specified force and a location not compressed were formed in the circumferential direction of the sealing material 11.

Next, as Condition 2, the nut 47 was tightened to all the plurality of T-head bolts 46 in the circumferential. direction at an excess torque of additional 20% of the specified torque.

For Condition 3, the socket 3 and the spigot 5 are joined at a maximum allowable bending angle.

Tests 1 and 3 were again carried out under the special conditions of Conditions 1 to 3, but when using the backup rings 65 and 70 of the shapes D and F, the bulb part 62 of the sealing material 11 in the compressed state did not enter the gap between the inner circumferential surface 56 of the socket 3 and the backup ring 65 or 70 and no water leakage was recognized in either case.

The invention claimed is:

1. A pipe joint with earthquake-proof function, wherein
a lock ring is accommodated in a lock ring accommodating groove formed at an inner surface of a socket of one pipe configuring said pipe joint,
a projection formed at an outer periphery of a distal end of a spigot of another pipe, configuring said pipe joint and being inserted to said socket, is configured to be able to engage with the lock ring from the socket inner side,
disengagement of the spigot from the socket is prevented as said lock ring is configured to be able to engage with said accommodating groove,
a tapered surface converging toward the opening side of the socket is formed on at least one of a portion of said lock ring engaging the accommodating groove and a portion of said accommodating groove engaging the lock ring,
when a disengagement prevention force in a pipe axial direction for preventing the spigot from being disengaged from the socket by said engagement is transmitted from the accommodating groove to the lock ring through the tapered surface, a line of action of a component force of said disengagement prevention force in a direction perpendicular to said tapered surface passes the opening side of the socket of a contacting point between a socket bottom end part of the lock ring and the outer periphery of the spigot along the outer surface of the spigot,
the tapered surface is formed at the portion of the lock ring engaging the accommodating groove, and an inclination angle of the tapered surface with respect to the spigot outer surface changes in accordance with a distance in a radial direction from the spigot outer surface to said engaging portion, and
the inclination angle of the tapered surface with respect to the spigot outer surface gradually decreases as the distance in the radial direction from the spigot outer surface to the accommodating groove engaging portion increases.

2. The pipe joint with earthquake-proof function according to claim 1, wherein the inclination angle of the tapered surface with respect to the spigot outer surface decreases in steps.

3. The pipe joint with earthquake-proof function according to claim 1, wherein the tapered surface is a smooth curved surface in which the inclination angle with respect to the spigot outer surface decreases in a stepless manner.

4. The pipe joint with earthquake-proof function according to claim 1, wherein the tapered surface is a combination of an inclined surface having a linear transverse cross section that changes in steps and a smooth curved surface that changes in a stepless matter.

5. A pipe joint with earthquake-proof function, wherein
a lock ring is accommodated in a lock ring accommodating groove formed at an inner surface of a socket of one pipe configuring said pipe joint,
a projection formed at an outer periphery of a distal end of a spigot of another pipe, configuring said pipe joint and being inserted to said socket, is configured to be able to engage with the lock ring from the socket inner side,
disengagement of the spigot from the socket is prevented as said lock ring is configured to be able to engage with said accommodating groove,
a tapered surface converging toward the opening side of the socket is formed on at least one of a portion of said lock ring engaging the accommodating groove and a portion of said accommodating groove engaging the lock ring,
when a disengagement prevention force in a pipe axial direction for preventing the spigot from being disengaged from the socket by said engagement is transmitted from the accommodating groove to the lock ring through the tapered surface, a line of action of a component force of said disengagement prevention force in a direction perpendicular to said tapered surface passes the opening side of the socket of a contacting point between a socket bottom end part of the lock ring and the outer periphery of the spigot along the outer surface of the spigot,
the tapered surface is formed on both the portion of the lock ring engaging the accommodating groove and the portion of the accommodating groove engaging the lock ring,
assuming that the width in the pipe axial direction of the inner circumferential surface of the lock ring is t, the height of the lock ring is H, the width in the pipe axial direction of the bottom surface of the accommodating groove is $T_0$, the inclination angle of the tapered surface of the accommodating groove with respect to the pipe axial center is $\theta 5$, the depth of the accommodating groove is V, the height of the projection is $h2$, and the dimension of the gap between the inner circumference of the socket and the outer periphery of the spigot is L, $$(L+V)-(t-T_0)\tan \theta 5 - H < h2$$

is satisfied, and
thereby when the lock ring is accommodated in the accommodating groove with said tapered surfaces not facing each other, the tapered surface of the accommodating groove and the outer periphery other than the tapered surface of the lock ring contact and the lock ring is not able to be accommodated up to the bottom side of the accommodating groove, and thus the lock ring protrudes inward in the radial direction from the accommodating groove, the spigot projection contacts said protruding portion when inserting the spigot to the socket, and the spigot is not able to be inserted into the socket.

6. A pipe joint with earthquake-proof function, wherein a lock ring is accommodated in a lock ring accommodating groove formed at an inner surface of a socket of one pipe configuring said pipe joint, a projection formed at an outer periphery of a distal end of a spigot of another pipe, configuring said pipe joint and being inserted to said socket, is configured to be able to engage with the lock ring from the socket inner side, disengagement of the spigot from the socket is prevented as said lock ring is configured to be able to engage with said accommodating groove, a tapered surface converging toward the opening side of the socket is formed on at least one of a portion of said lock ring engaging the accommodating groove and a portion of said accommodating groove engaging the lock ring, when a disengagement prevention force in a pipe axial direction for preventing the spigot from being disengaged from the socket by said engagement is transmitted from the accommodating groove to the lock ring through the tapered surface, a line of action of a component force of said disengagement prevention force in a direction perpendicular to said tapered surface passes the opening side of the socket of a contacting point between a socket bottom end part of the lock ring and the outer periphery of the spigot along the outer surface of the spigot, a sealing material is arranged in a compressed state between the socket and the spigot at the opening side of the socket of the lock ring, a backup ring that presses against the outer peripheral surface of the spigot is arranged between the inner circumferential surface of the socket and the outer peripheral surface of the spigot at between the sealing material and the lock ring, and the backup ring includes a small diameter part formed so as to be arranged on the inner side than said inner circumferential surface of the socket, and a large diameter part formed with a greater diameter than the small diameter part and preventing said sealing material in the compressed state from entering a gap between said inner circumferential surface of the socket and said small diameter part.

7. The pipe joint with earthquake-proof function according to claim 6, wherein a maximum outer diameter of the large diameter part is formed greater than the inner diameter of the inner circumferential surface of the socket, and when the backup ring is arranged at a position corresponding to the inner circumferential surface of the socket, a portion of said large diameter part formed greater than the inner diameter of the inner circumferential surface of the socket presses against said inner circumferential surface.

8. The pipe joint with earthquake-proof function according to claim 7, wherein a cut-out part is formed in the backup ring for deforming the large diameter part when the backup ring is arranged at the position corresponding to the inner circumferential surface of the socket.

9. The pipe joint with earthquake-proof function according to claim 7, wherein the backup ring includes a main body part configuring the small diameter part, and a projecting part configuring the large diameter part formed so as to project outward in the pipe diameter direction from the main body part.

10. The pipe joint with earthquake-proof function according to claim 7, wherein the backup ring is formed into a tapered shape from the large diameter part to the small diameter part.

* * * * *